United States Patent
Lee et al.

(10) Patent No.: US 11,366,846 B2
(45) Date of Patent: Jun. 21, 2022

(54) APPARATUS AND A METHOD FOR PROVIDING EXPRESSION ITEM SERVICES WHICH CONSTRUCTING DIGITAL COMMUNICATION ENVIRONMENTS

(71) Applicant: Platfarm Inc., Seoul (KR)

(72) Inventors: Hyo Sub Lee, Seoul (KR); Woo Won Hwang, Seoul (KR)

(73) Assignee: PLATFARM INC., Seoul (KR)

( * ) Notice: Subject to any disclaimer, the term of this patent is extended or adjusted under 35 U.S.C. 154(b) by 317 days.

(21) Appl. No.: 16/657,565

(22) Filed: Oct. 18, 2019

(65) Prior Publication Data

US 2021/0103610 A1    Apr. 8, 2021

(30) Foreign Application Priority Data

Oct. 7, 2019    (KR) .................. 10-2019-0123599

(51) Int. Cl.
| | |
|---|---|
| G06F 16/00 | (2019.01) |
| G06F 16/45 | (2019.01) |
| G06K 9/62 | (2022.01) |
| G06N 20/00 | (2019.01) |
| G06F 16/44 | (2019.01) |
| G06F 16/435 | (2019.01) |

(52) U.S. Cl.
CPC ............ G06F 16/45 (2019.01); G06F 16/435 (2019.01); G06F 16/444 (2019.01); G06K 9/6267 (2013.01); G06N 20/00 (2019.01)

(58) Field of Classification Search
CPC ...... G06F 16/45; G06F 16/435; G06F 16/444; G06F 2203/0381; G06K 9/6267; G06N 20/00; G06N 3/0445; G06N 3/0454; G06N 3/0472; G06N 3/084; G06N 5/003; G06N 20/20; G06Q 50/30; H04L 51/04; H04M 1/7243
See application file for complete search history.

(56) References Cited

U.S. PATENT DOCUMENTS

| | | | | |
|---|---|---|---|---|
| 9,984,499 | B1* | 5/2018 | Jurgenson | G06T 19/006 |
| 10,870,056 | B2* | 12/2020 | Taylor | A63F 13/655 |
| 10,984,226 | B2* | 4/2021 | Wang | G06K 9/00302 |
| 2016/0217623 | A1* | 7/2016 | Singh | G09G 3/003 |
| 2018/0137529 | A1* | 5/2018 | Griffin | H04L 51/18 |
| 2018/0300917 | A1* | 10/2018 | Barnett | G06T 11/60 |
| 2018/0336714 | A1* | 11/2018 | Stoyles | G06K 9/00228 |

(Continued)

FOREIGN PATENT DOCUMENTS

| | | |
|---|---|---|
| KR | 10-2015-0033900 A | 4/2015 |
| KR | 10-2016-0112260 A | 9/2016 |

(Continued)

Primary Examiner — Jared M Bibbee
(74) Attorney, Agent, or Firm — Novick, Kim & Lee, PLLC; Sang Ho Lee; Hyun Woo Shin

(57) ABSTRACT

A message service providing apparatus includes: a message interface unit for providing a message interface to a user terminal, processing a message transmitted and received through the message interface, and providing one or more expression items that can be included in the message to the user terminal through the message interface; and an active object database management unit for performing an active object database management process of each expression item to provide one or more expression items through an extended reality interface.

18 Claims, 43 Drawing Sheets

(56) References Cited

U.S. PATENT DOCUMENTS

2019/0012527 A1* 1/2019 Wang .................. H04L 51/10
2019/0108578 A1* 4/2019 Spivack ................ G09G 5/14

FOREIGN PATENT DOCUMENTS

| KR | 10-2017-0001490 A | 1/2017 |
| KR | 10-1791979 B1 | 11/2017 |
| KR | 10-2019-0019465 A | 2/2019 |

* cited by examiner

APPARATUS AND A METHOD FOR PROVIDING EXPRESSION ITEM SERVICES WHICH CONSTRUCTING DIGITAL COMMUNICATION ENVIRONMENTS

BACKGROUND OF THE PRESENT INVENTION

Field of the Present Invention

The present invention relates to a message service providing apparatus and a method thereof, and more specifically, to a message service providing apparatus and a method thereof, which actively construct an expression item database used for message exchange so that the database may be applied to extended reality.

Background of the Related Art

In a message service such as chatting service, various forms of expression methods, such as emoticon, emoji and the like, are used to express emotion of users.

The emoticon is a term combining emotion and icon, which is a symbol used to express emotion of service users in a chatting service, and although emoticons of early stage are made by simply combining various symbols and characters on a keyboard, they are recently developed into a form expressing emotion of users through various forms of character images.

In addition, unlike the emoticons based on combination of characters, the emoji is a method of outputting pictorial characters embedded in the form of a font of a platform system, and a method of outputting an emotion expression image corresponding to an inputted emoji code is presented as an example.

As demands of service users for the emoji and emoticon increase, it is generalized in a message service to specify various kinds of items and provide the service users with the items.

However, existing expression items are only aiming at abstractly expressing or displaying a speaker's opinion using a simple image file, and there is a limit in clearly delivering an opinion in relation to a message.

Although message applications capable of providing various items according to a voice, an image, a video, text or a combination of these through the Internet or the like are proposed to solve the problem, applications up to the present are very inconvenient in the selection and input process since a user should examine all the numerous expression items and select and link a desired item or upload an image file, and the applications provide a limited service in the face of fundamental limitation of today's message services.

Particularly, there is a problem in that most of the message service applications only provide images added to a message transmitted and received between interested parties and expression items of various types and formats that a user desires to select may not be predicted and systematically provided, and this is a very limited expression transfer method used inefficiently.

In addition, the existing expression items such as emoji, emoticons and the like are inconvenient in that images matching each expression should be arbitrarily created by a designer, the created images should be matched to an expression and stored in the platform system, and an image may be inputted into a message only when a user calls and selects the image on the platform system in which the image is stored.

In the current environment where demands for emoji and emoticons are continuously increasing, this may generate the problems of design cost increasing in proportion to the number of created images, system construction cost increasing due to update of the platform, an input time extended due to increase of unnecessary images when the user inputs, or display of a plurality of unwanted images.

Due to these limitations and inconveniences, it is general to update the emoji and emoticons by system OS or messenger platform on a large scale at a cycle of a considerably long period of time, and particularly, although a problem or a complaint about a particular image occurs in such an environment, it may not be reflected in real-time.

Furthermore, although the current message service applications provide only emoji and emoticons using only a video or an image, construction of expression items of a more expanded form and a database thereof is requested in a new environment interface such as extended reality, augmented reality or virtual reality, which is increasing in use recently.

SUMMARY OF THE PRESENT INVENTION

Therefore, the present invention has been made in view of the above problems, and it is an object of the present invention to provide a message service providing apparatus and a method thereof, which can construct an expression item database as a learning process-based active object database according to various user variable information such as user profile, user's emotion, message contents and the like, select and determine suitable expression items corresponding to a message inputted by the user, and provide the expression items as an expression package list corresponding to various user-selectable environments including extended reality.

In addition, another object of the present invention is to provide a message service providing apparatus and a method thereof, which can provide an expression package list corresponding to various user-selectable environments even in an extended reality environment by actively performing construction of expression items of an extended form and a database thereof that can be used in a new environment interface such as extended reality(eg. augmented reality, virtual reality or the like).

In addition, yet another object of the present invention is to provide a message service providing apparatus and a method thereof, which can gradually produce natural expression images without the burden of separate design time and cost owing to accumulation of learning data according to machine learning and reflect real-time feedback corresponding thereto, and thus may provide combination-type expression items which can provide emoji and emoticons reflecting maximized diversity and feedback.

To accomplish the above objects, according to one aspect of the present invention, there is provided a message service providing apparatus comprising: a message interface unit for providing a message interface to a user terminal, processing a message transmitted and received through the message interface, and providing one or more expression items that can be included in the message to the user terminal through the message interface; and an active object database management unit for performing an active object database management process of each expression item to provide one or more expression items through an extended reality interface.

In addition, according to one aspect of the present invention, there is provided an operating method of a message service providing apparatus, the method comprising the steps of: providing a message interface to a user terminal; processing a message transmitted and received through the message interface; providing one or more expression items that can be included in the message to the user terminal through the message interface; and performing an active object database management process of each expression item to provide one or more expression items.

DETAILED DESCRIPTION OF THE PREFERRED EMBODIMENT

Hereinafter, only the principle of the present invention will be described. Therefore, those skilled in the art may implement the principle of the present invention that is not clearly described or shown in this specification and invent various apparatuses included within the concept and scope of the present invention. In addition, it should be understood that in principle, all the conditional terms and embodiments arranged in this specification should be clearly intended only for the purpose understanding the concept of the present invention and are not restrictive to the embodiments and states specially arranged like this.

In addition, it should be understood that all the detailed descriptions arranging specific embodiments, as well as the principle, viewpoint and embodiments of the present invention, are intended to include structural and functional equivalents thereof. In addition, it should be understood that these equivalents include the equivalents that will be developed in the future, as well as the equivalents open to the public presently, i.e., all the components invented to perform the same function regardless of the structure.

Accordingly, for example, the block diagrams of the present invention should be understood as showing a conceptual viewpoint of an exemplary circuit which specifies the principle of the present invention. Similarly, all flowcharts, state transition diagrams, pseudo codes and the like should be understood as being practically stored in a computer-readable medium and showing various processes performed by a computer or a processor regardless of whether the computer or the processor is clearly shown in the figure.

In addition, clear use of a term presented as a processor, a controller or a concept similar thereto should not be interpreted by exclusively quoting hardware capable of executing software and should be understood to implicitly include digital signal processor (DSP) hardware and ROM, RAM and non-volatile memory for storing the software without limit. It may include already-known other hardware.

The objects, features and advantages described above will be further clear through the following detailed descriptions related to the accompanying drawings, and therefore, those skilled in the art may easily embody the spirit of the present invention. In addition, in describing the present invention, when it is determined that the detailed description of the known techniques related to the present invention may unnecessarily blur the gist of the present invention, the detailed description will be omitted.

Hereinafter, a preferred embodiment according to the present invention will be described in detail with reference to the accompanying drawings.

Figure 1:
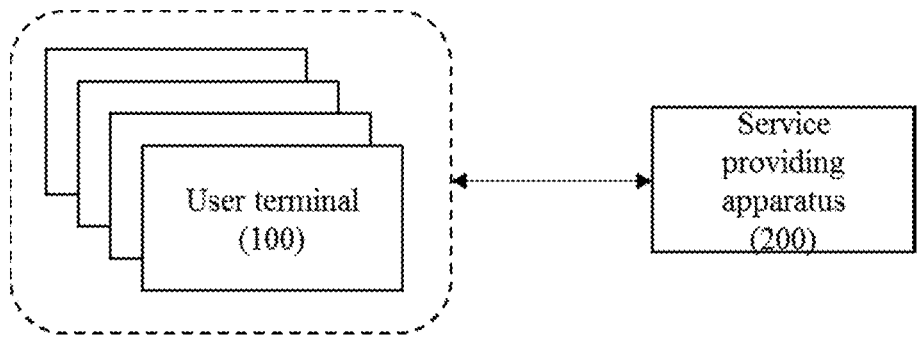
FIG. 1 is a view schematically showing the overall system according to an embodiment of the present invention.

FIG. 1 is a view schematically showing the overall system according to an embodiment of the present invention.

Referring to FIG. 1, a system according to an embodiment of the present invention may include a plurality of user terminals 100 and a service providing apparatus 200.

More specifically, the user terminals 100 and the service providing apparatus 200 may be wiredly or wirelessly connected through a network, and for the communications between the networks, each user terminal 100 and the service providing apparatus 200 may transmit and receive data through an Internet network, LAN, WAN, Public Switched Telephone Network (PSTN), Public Switched Data Network (PSDN), a cable TV network, Wi-Fi, a mobile communication network or other wireless communication networks. In addition, each user terminal 100 and the service providing apparatus 200 may include a communication module for communicating in a protocol relevant to each communication network.

In addition, although the user terminal 100 described in this specification may include a cellular phone, a smart phone, a laptop computer, a digital broadcasting terminal, a Personal Digital Assistant (PDA), a Portable Multimedia Player (PMP), a navigator and the like, the present invention is not limited thereto, and the user terminal 100 may be other various devices capable of user input and information display.

In a system like this, the user terminal 100 may be connected to the service providing apparatus 200 and provided with an interface service with other user terminals.

For the process like this, the service providing apparatus 200 may provide the user terminal 100 with a message interface and performs a process of transferring messages received through the message interface to other user terminals or transferring messages received from other user terminals to the user terminal 100.

For example, the service providing apparatus 200 may be a chatting server device, and the user terminal 100 may be a portable terminal in which a chatting application is installed. The service providing apparatus 200 may provide a chatting interface among the user terminals or in a group created by the user terminals 100 and relay and store messages transmitted and received through the chatting interface.

The messages processed by the service providing apparatus 200 may include various message contents, and the message contents may include data of a format of an e-mail or a short or long text message. The service providing apparatus 200 may transmit the message contents in a data format of an e-mail or a short or long text message through a mobile communication network or a dedicated Internet network.

In addition, the message contents may be message contents transmitted and received through an extended reality services as augmented reality (AR) or virtual reality (VR) services. Here, the message contents transmitted and received through the AR or VR services may include augmented message objects or virtual message objects outputted through a three-dimensional coordinate system, and the message contents may include at least one among a three-dimensional video, an image, text and a sound object interacting according to viewpoint switch, motion input, touch input or voice input of a user.

Meanwhile, the service providing apparatus 200 may be implemented as a server device performing general functions, such as a communication protocol conversion server, a file server, a collect server, a push gateway server, a transmission server, an account server, an administration server, a reception server, a conversion server, a messaging server, a push reception server, a push transmission server or the like.

In addition, communication networks to which the user terminal 100 and the service providing apparatus 200 are connected may be networks different from each other, and accordingly, the service providing apparatus 200 may provide a data conversion process conforming to each network protocol. In addition, the service providing apparatus 200 may manage message information by encrypting all or part of the message information as needed.

In addition, the service providing apparatus 200 according to an embodiment of the present invention may provide the user terminal 100 with various additional information or functions processed according to a message service, provide a service subscription and affiliation process, and further perform a billing process or the like for providing affiliated services of a plurality of business servers through communication with a financial server.

In addition, other applications may be separately installed in the user terminal 100, and the user terminal 100 may basically include the configuration of a general portable terminal separately including a control unit (not shown), a storage unit (not shown), an output unit (not shown) and a communication unit (not shown).

When the service providing apparatus 200 provides a relay service of message contents transmitted and received through the message interface of the system like this, one or more expression items may be included in the message interface.

The expression items may be configured as data of various formats, i.e., data of a form that can be outputted through the user terminal 100 and showing the emotion, mood, state and other opinions of a user desired to be expressed, or a data set combining data of a plurality of formats.

For example, the expression items may include an expression item matching to a keyword extracted from specific expression information, an expression sound item, an expression video item, an expression additional item, an expression multimodal item, and a composite expression item configured as a combination of these.

For example, the expression item may be configured as a data of a pictorial character emoji format matching to specific expression information, a character emoticon format, a separately specified pictorial file format, a file format allowing movement, or an Internet address format capable of acquiring image information.

In addition, the expression sound item may be configured as a data of an audio format matching to specific expression information, a separately specified voice file format, a voice file format extracted from a video, or an Internet address format capable of acquiring voice information.

In addition, the expression video item may be configured as a data of a video format matching to specific expression information, a separately specified video file format, or an Internet address format capable of acquiring video information.

In addition, the expression additional item may include driving command information of an additional function that can be supported, as a function of the user terminal 100 to effectively support expression, and in this case, a format data of code information or the like for driving of an additional function corresponding to the expression information may be presented as an example.

Meanwhile, the expression multimodal item may include a multimodal object that can be matched to message contents transmitted and received through an extended reality service as an augmented reality (AR) or virtual reality (VR) service. The multimodal object may be matched to a message object transmitted and received through the augmented reality (AR) or virtual reality (VR) service and may include at least one among a three-dimensional video, an image, text and a sound object interacting according to viewpoint switch, motion input, touch input or input of voice input corresponding to the user terminal 100. Therefore, according to an embodiment of the present invention, since the expression items may be provided as a combination of display or audio at a predetermined position on a three-dimensional coordinate system to be interoperable among the users, it can be provided as a virtual reality or augmented reality object which provides expression information related to message contents, and thus its range of expression can be expanded greatly.

In addition, the expression items may include a composite expression item, which is configured as a combination of the items, and abundant and enhanced emotional expressions may be provided in association with a message through a chatting application according to various combinations, for example, an expression item and a sound item mapped to a keyword of specific expression information may be compositely configured and provided, or expression video items are compositely configured and provided.

Here, the expression information may include a keyword of emotion, mood, state or other opinions and a data expressing additional description, and one or more keywords and a data expressing additional description may be matched to an image.

In addition, a data set of the items described above may be previously provided in the service providing apparatus 200 according to keyword matching corresponding to the expression information, and a database construction and update process for the data set may be performed.

In addition, as the service providing apparatus 200 provides a registration process of the user terminal 200 for configuration of the data set of expression items, personalized and diversified individual opinion item packages may be registered in a database and used, and as the service providing apparatus 200 provides a function of sharing the item packages with other users, the expression items may be exchanged or used among service users.

Here, the service providing apparatus 200 may provide management of use by individual expression item package, and as a profit distribution process of a use fee or the like is provided to a registrar on the basis of statistical data on the use, expression items of more superior quality may be processed to be registered and shared. For the sake of the profit distribution process or the like, the service providing apparatus 200 may provide a use fee billing service corresponding to the use of expression item packages or individual expression items. The service providing apparatus 200 may calculate a use fee corresponding to the use of expression item packages or individual expression items and perform a billing process for a user or perform a subtraction process corresponding to a previously accumulated amount or the number of times of using the items. Accordingly, the service providing apparatus 200 may perform operation of a platform providing the message interface and the expression items using the profits generated by the billing process, and as a predetermined portion may be provided to the registrar, quality of the service can be maintained.

In addition, as the service providing apparatus 200 may recommend and provide more natural expression items to the user terminal 100 according to a use rate by creating and strengthening a learning model of the database according to the statistical information on the use and a feedback learning process.

For example, the service providing apparatus 200 may determine a distribution priority of the expression items according to various environmental conditions in association with a message inputted from the user terminal 100, and may process to allow the user to greatly extend the range of expression by determining provision and recommendation of expression items corresponding thereto or a data set thereof, and as a result, the data may be efficiently stored and structured as a set and an object.

The process of providing expression items like this may be performed through diversified channels according to the environmental condition of each user terminal 100 by providing the process to the user terminal 100 through an API provided by the service providing apparatus 200, mounting an SDK module implemented as a separated function on the user terminal 100, mounting the process on the user terminal 100 in the form of an APP that can be separately downloaded and installed, or directly transmitting the process from the service providing apparatus 200.

In addition, the service providing apparatus 200 may provide the user terminal 100 with more suitable expression items by performing an expression item optimization process including conversion of the format and size of the expression items, according to the message interface and distribution information for providing the expression items.

Through the process like this, when a message is inputted into the user terminal 100 through the message interface, an expression item set corresponding to the message may also be outputted on the message interface, and the user may select and input desired expression items or a combination of these, and a message including the inputted expression items or a combination of these may be transferred to other user terminals or registered and recommended as a posting in a group chatting room.

In addition, the service providing apparatus 200 may construct an expression item learning model by performing a learning process corresponding to previously stored existing expression items and recommend expression items suitable for the user profile, the expression message and the user environment or a combination of these on the basis of the learning model.

In addition, for example, the learning model may be a model for deriving correlation of existing messages and expression items with the user profile, the expression message and the user environment information, and for the sake of learning like this, the service providing apparatus 200 may collect needed data and variable information and perform a learning process using the variable information as an input value.

Accordingly, according to an embodiment of the present invention, as natural expression items more suitable for the user profile, the user environment and the message may be actively combined and recommended as the learning data is accumulated and real-time feedback corresponding thereto may be reflected, a message processing method which can provide diversified and personalized expression items and an apparatus thereof can be provided.

In addition, the expression items according to an embodiment of the present invention may include images and text expressing the emotion, mood, state and other opinions of a user desired to be expressed, and the image may be configured of, for example, data of a pictorial character emoji format matching to specific expression information, a character emoticon format, a separately specified pictorial file format, or a file format allowing movement. In addition, the expression information may include a keyword of emotion, mood, state or other opinions and a data expressing addition description, and one or more keywords and a data expressing additional description may be matched to an image. The expression item may be automatically formed through learning within the apparatus on the basis of context of dialog between the user and a chatting counterpart.

Accordingly, the service providing apparatus 200 may combine expression information, text and images and store and manage the combined information as an expression item, and the service providing apparatus 200 may create an expression item list and provide the list through a message interface outputted from the user terminal 100.

The user terminal 100 may input a message through the message interface or select and input a desired expression item from the expression item list, and a message including the inputted expression item may be transferred to another user terminal or registered as a posting in a group chatting room.

In addition, the service providing apparatus 200 may create and recommend expression items by performing learning corresponding to the expression items inputted from the expression item list inputted through the message interface of the user terminal 100, analyze accuracy of the created expression items and create expression items reflecting the accuracy, and newly recommend the expression items to the user.

Figure 2:
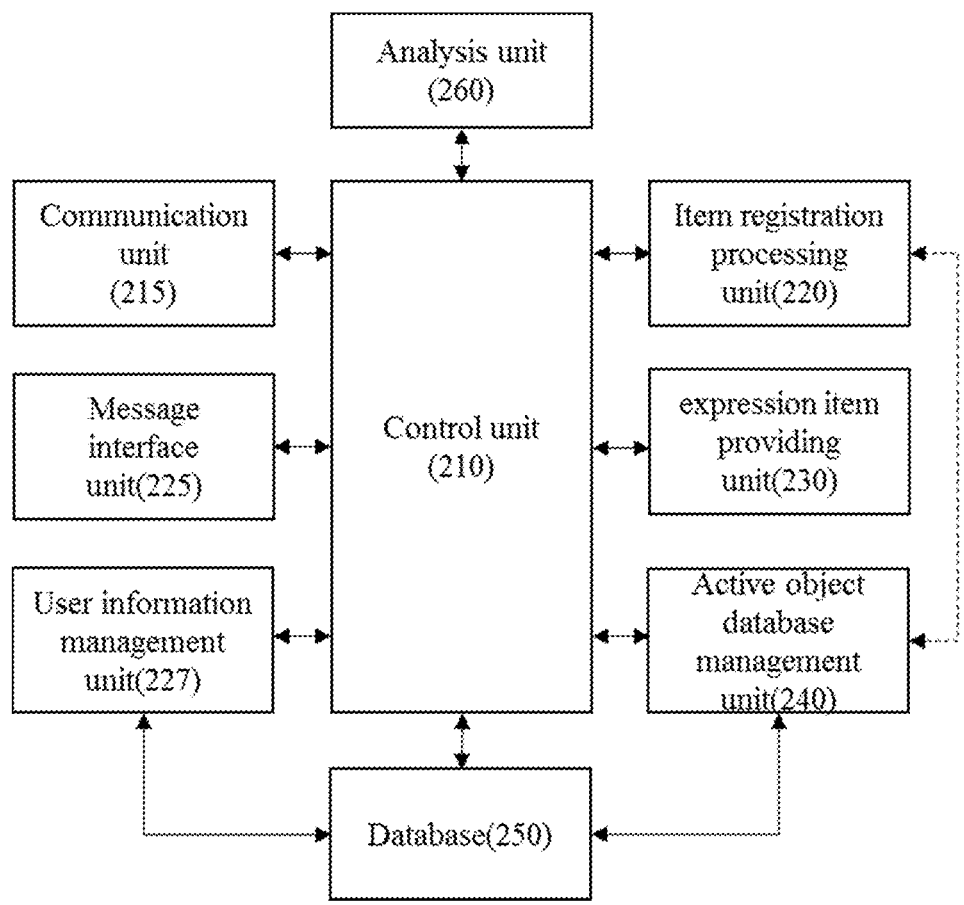
FIG. 2 is a block diagram more specifically showing a service providing apparatus according to an embodiment of the present invention.
Figure 3:
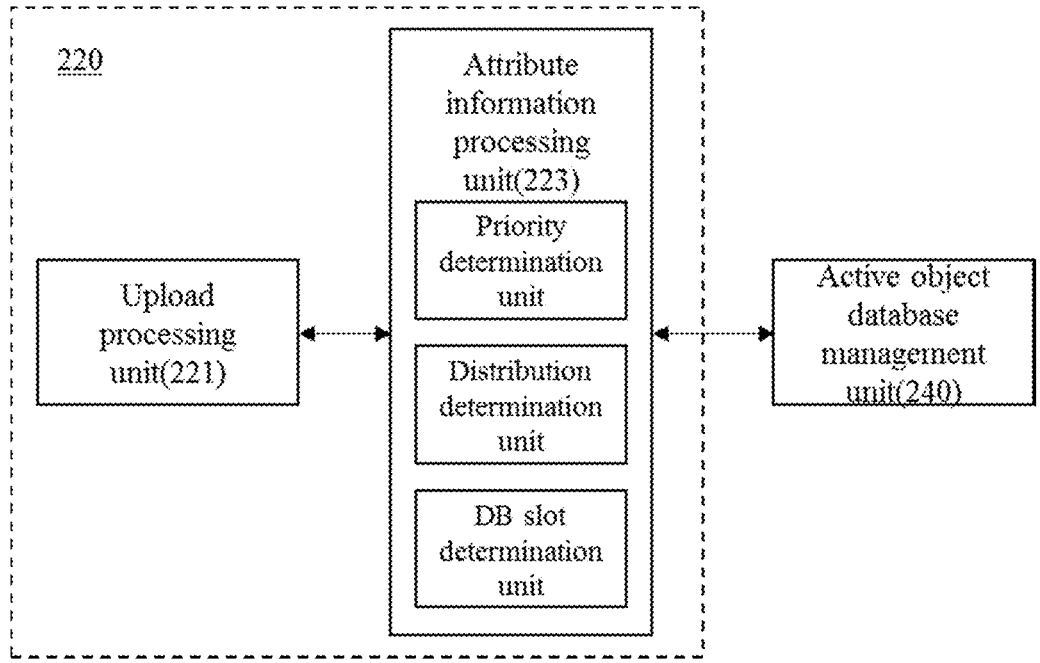
FIG. 3 is a block diagram more specifically showing an item registration processing unit according to an embodiment of the present invention.

FIG. 2 is a block diagram more specifically showing a service providing apparatus according to an embodiment of the present invention, and FIG. 3 is a block diagram more specifically showing an item registration processing unit according to an embodiment of the present invention.

Referring to FIGS. 2 and 3, the service providing apparatus 200 may include a control unit 210, a communication unit 215, a message interface unit 225, a user information management unit 227, an item registration processing unit 220, an expression item providing unit 230, an active object database management unit 240, a database 250, and an analysis unit 260.

The control unit 210 may control general operation of each module, provide an operation process according to a service providing method according to an embodiment of the present invention, and include one or more microprocessors for this purpose.

The communication unit 215 may include one or more modules which allow wired or wireless communication between the networks in which the user terminal 100 or the service providing apparatus 200 is positioned. For example, the communication unit 215 may include at least one among a mobile communication module, a wired Internet module, a wireless Internet module, and a short distance communication module.

In addition, the user information management unit 227 may process registration of user information for the users using a service according to an embodiment of the present invention. The user information may include user identification information for transmitting and receiving messages, and user profile information and user environment information corresponding to the user identification information. The user information may be newly registered, updated and managed in response to a user information registration or update request received from the user terminal 100 through the user information management unit 227. In addition, all or part of the user information may be encrypted and stored.

Here, the user profile information may include personalized profile information such as the gender, age, country, language, region and the like of the user and dialog information and may be processed according to the registration process of the user information management unit 227. The user environment information may include, for example, OS information, version information, application installation information, terminal identification information, dialog information, preference information and the like collected from the user terminal 100.

In addition, the user information management unit 227 may provide a registration process of the user terminal 100 for the item registration processing unit 220 to configure a data set of expression items, and provide a compensation service corresponding to a participating user. Here, compensation information may be separately stored, called and managed by the database 250, and the user information management unit 227 may create and share compensation log records and compensation-related blocks on a shared network such as a block chain.

In addition, the user information management unit 227 may store and manage compensation processing information for the registration and feedback in the database 250 as statistical information of expression items, and a storage method of statistical information data may be implemented in a format of one or more among tag information, registration information, setting information, label, token and block that can be interpreted.

The message interface unit 225 may relay, store and manage messages transmitted and received from each user terminal 100 through the communication unit 215. Here, the expression item providing unit 230 may acquire expression items that can be provided to the user terminal 100 in response to the messages transmitted and received through the message interface unit 225 and provide the user terminal 100 with an interface for providing or recommending the acquired expression items through the message interface unit 225.

Here, the message interface may be provided in various forms. For example, the message interface may include at least one among a dialog window interface, a keyboard interface, and a multimodal interface.

In addition, the message interface unit 225 may provide the user terminal 100 with more suitable expression items by performing an expression item optimization process including conversion of the format and size of the expression items according to the message interface and distribution information for providing the expression items.

Meanwhile, the database 250 may store programs for operation of each component, store input and output data (e.g., expression keyword information, expression item and combination data set information, mapping information, profile information, user environment information, contents information, function information and the like), and store and manage a database separately classified for learning process. In addition, the database 250 may support service provision based on a block chain network and store block chain information including node information, hash information, transaction information, block information, block chain information, and identification information for this purpose. The control unit 210 may provide control of the message interface unit 225 by utilizing a block chain network and related services using the block chain information.

In addition, the item registration processing unit 220 may process registration and management of expression item packages requested to be registered by the user terminal 100 or a separate server, and the registered item package data may be transferred to the active object database management unit 240. In addition, the item registration processing unit 220 may directly upload the item package data requested to be registered on the database 250.

The active object database management unit 240 may store and manage the expression items registered by the item registration processing unit 220 by matching previously stored expression items and the registered expression items according to classification information thereof. Particularly, as the active object database management unit 240 processes data set association among the expression items in correspondence to key expression items in the storage and management process, composite expression items based on the active data classification and key object may be processed to be combined and provided to the user terminal 100 through the expression item providing unit 230.

More specifically, as shown in FIG. 3, the item registration processing unit 220 may include an upload processing unit 221 and an attribute information processing unit 223.

According to an embodiment of the present invention, the upload processing unit 221 receives an expression item package registration request data from the user terminal 100 and transfers the request data to the attribute information processing unit 223 in response to a request of the user terminal 100 or a server.

Here, the package registration request data may include at least one among package name information, additional description information, package tag information, emotion identification information, similar expression information, or text combination information as basic registration information.

In addition, the package registration request data may include at least one among an upload file or address information corresponding to an expression item, item code information, package code information, registrar code information, contents association code information, and DB connection code information, as item registration information.

In addition, the package registration request data may further include at least one among basic matching information, matching code information, registered language information, and matching emotion information, as matching information for matching expression items to attribute information.

In addition, the attribute information processing unit 223 may determine priority information, distribution field information and DB slot information corresponding to each expression item on the basis of the basic matching information, the item registration information and the matching information identified from the package registration request data.

To this end, the attribute information processing unit 223 may include a priority determination unit, a distribution determination unit, and a DB slot determination unit, and the attribute information determined by the attribute information processing unit 223 may be transferred to the active object database management unit 240 and used for final object database determination and subsequent management.

Accordingly, the active object database management unit 240 may receive the package registration request data according to the registration process and the attribute information process performed by the item registration processing unit 220, construct an active expression item database, and store and manage the constructed expression items in the database 250.

Figure 4:
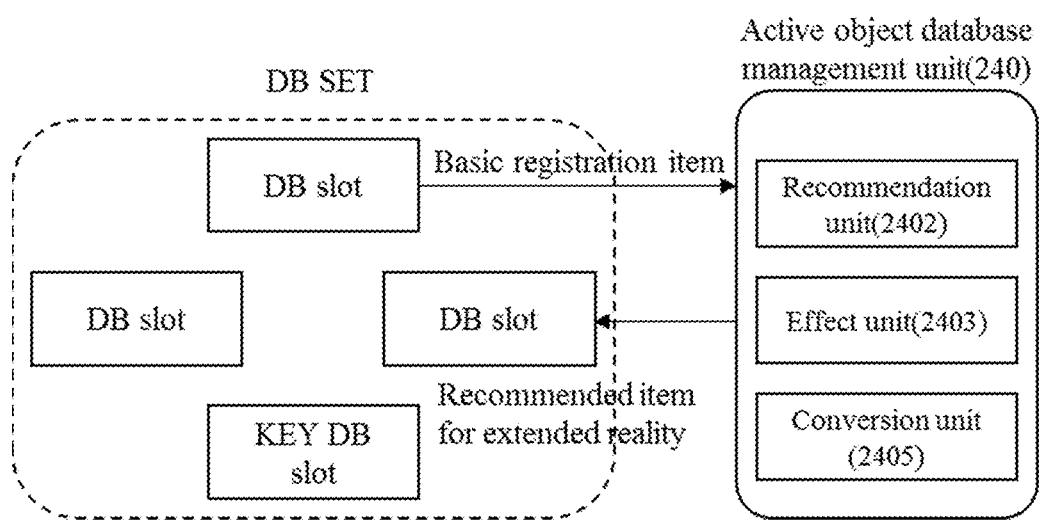
FIG. 4 is a view illustrating a DB slot structure for active object database registration according to an embodiment of the present invention.
Figure 5:
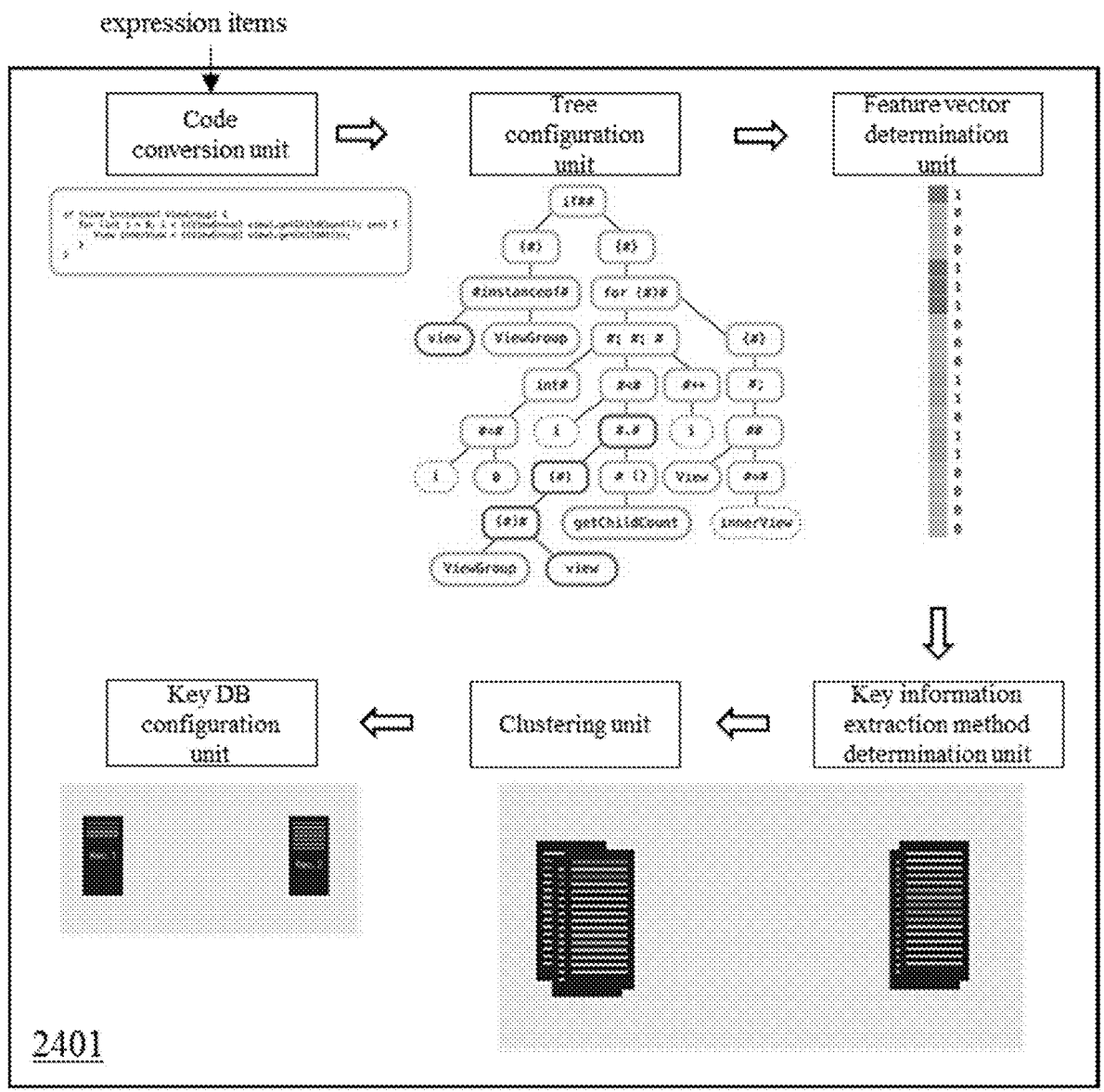
FIG. 5 is a view illustrating a key DB configuration process according to an embodiment of the present invention.

FIG. 4 is a view illustrating a DB slot structure for active object database registration according to an embodiment of the present invention, and FIG. 5 is a view illustrating a key DB configuration process according to an embodiment of the present invention.

The active object database management unit 240 may allocate key information to an expression key database slot to link composite expression items to one database structure, and the key information may include key text information expressing, for example, opinion or emotion information, and as the key information may correspond to diverse environment information matching a representative value or the like corresponding to a specific situation, preference, trend, and user information, an appropriate key database corresponding to each situation or environment may be actively created.

In addition, to allocate key information to an expression key database slot for linking expression items to one database structure, the active object database management unit 240 may perform a matching process corresponding to at least one among the priority information, emotion information, text information, additional information, expression item information or language information, feedback information, learning information, trend information, and user preference information included in the attribute information of the expression item.

In addition, to configure a data set corresponding to extended reality, when a data is registered in a DB slot, the active object database management unit 240 may perform a process of learning and recommending a model to be suitable for a condition corresponding to extended reality, converting and combining the registered data as an asset of another format, and allocating the asset to an empty DB slot of the current data set. Accordingly, although only one data is registered, a plurality of data sets may be formed as an extended reality asset, and sound matching, background matching, shade matching, color matching, and modeling learning suitable for each extended reality are possible.

To this end, the active object database management unit 240 may include a recommendation unit 2402, an effect unit 2403, and a conversion unit 2405.

When a basic data is registered in the DB slot, the recommendation unit 2402 may configure an extended reality asset data set configured of the items recommended for extended reality, by inserting expression items recommended for configuration of a data set corresponding to extended reality into remaining slots of the expression data set in correspondence to the basic data.

In addition, the active object database management unit 240 may configure an asset data set by performing a learning-based modification process on a position, a size, a background transparency, background change, image optimization and the like according to a user device model and a set environment to which the asset data set will be applied.

In addition, the effect unit 2403 may apply additional effect information that can be animated to the asset data set, and the conversion unit 2405 may perform a suitable three-dimensional conversion process on an asset data set corresponding to extended reality (e.g. virtual reality or augmented reality).

In addition, the active object database management unit 240 may perform a learning and recommendation process by profile, persona, type, theme, and trend based on analysis of dialog, on the basis analysis information analyzed by the analysis unit 260. Accordingly, the data set for extended reality configured according thereto may be diversely combined, created, registered, recommended and displayed in various message interfaces.

Meanwhile, the active object database management unit 240 may identify attribute information of the expression item data analyzed by the database 250 or processed by the attribute information processing unit 223 and, when the attribute information matches key information of the identified expression items, allocate the matching expression items to each database slot configuring an expression item database set.

For example, when attribute information, such as description, information, text, emotion and situation information identified by the attribute information processing unit 223, is confirmed and there exists a database set in which keyword information of a key database slot matching thereto exists, the active object database management unit 240 may allocate the expression items to each database slot of the database set. When a key database slot matching the attribute information does not exist, the active object database management unit 240 may perform a process of creating a new database set.

In creating a new key database, it is possible to create a key database according to a preset condition, create a key database recommended by at least one operation among machine learning, statistical data and learning modeling, or temporarily create a key database, and it is also possible to perform a process of creating a key database by performing determination of distribution and determination of priority according to DB information uploaded by the user.

Meanwhile, the method of configuring slots of a database described above in FIG. 4 may be advantageous in actively configuring and managing an object database as far as the space in which data are stored is not affected by whether the database is relational or non-relational in a broad sense, and it has an effect of adaptively changing the construction without being greatly affected by the change of the message interface and the contents system that can be diversely changed in the future.

Referring to FIG. 5, the active object database management unit 240 may use a database tree method, as well as a DB slot method as shown in FIG. 4, in determining key information and configuring a key DB.

The database tree method is a method easy to apply the association with a learning process, which makes it easy to construct and manage a database based on learning, may extract key information useful for learning clustering and matching, and may easily process configuration of a key DB corresponding thereto. Here, a database tree is associated with a learning process, may be affected by whether the database is relational or non-relational, and may be processed to be different from the DB slot method that is separately distinguished to have a low mutual influence.

Preferably, a parse tree configuration method may be presented as an example of the database tree method, and this makes it easy to construct a structure of code-converted items and easily extract a feature vector from the structured items, and accordingly, a key DB may be configured as the active object database management unit 240 acquires key information capable of matching and clustering the items.

Accordingly, as the active object database management unit 240 according to an embodiment of the present invention may separately include a key DB management unit 2401 or may be provided with all or part of the function of the key DB management unit 2401 from an external device or a cloud server, the key DB management unit 2401 may include a code conversion unit, a parse tree configuration unit, a feature vector determination unit, a key information extraction method determination unit, a clustering unit, and a key DB configuration unit as shown in FIG. 5.

The code conversion unit performs code conversion corresponding to the expression items to create an expression key database for linking the expression items to one database structure. Here, the expression items may be various videos, images, three-dimensional objects, audios, or a combination of these, and the code conversion unit may process conversion of the items in a code format for configuration of a tree.

In addition, the parse tree configuration unit may configure a database tree based on the code-converted expression items. Here, the database tree may be preferably a parse tree which makes it easy to construct an expression item key database.

The parse tree is a method of configuring a code-based tree and may include a structure data constructing a structure of continuous code syntax data in the form of a tree. The parse tree may be configured of only constitutional components of an inputted code syntax without separate symbols and may be created on the basis of relation information among the constitutional components. Although the parse tree may be generally used for interpretation of a programming language or a natural language, the tree configuration unit according to an embodiment of the present invention may obtain an effect of constructing the configuration of a key database to be easy for learning by configuring a parse tree for determining a feature vector of the code-converted expression items.

Meanwhile, the feature vector determination unit determines a feature vector based on rank information or frequency information of a constitutional component, in response to the expression item data configured as a tree. In addition, the key information extraction method determination unit determines a key information extraction method for clustering the expression items on the basis of the database tree or the feature vector. Here, key information may include a common feature vector, which facilitates classification of expression items. Accordingly, the clustering unit may extract and classify the key information of the expression items configured as a tree, and the key DB configuration unit constructs a key database on the basis of the key information representatively shared according to the classification, and thus an active object database, which facilitates learning among data having a relationship, can be constructed.

Meanwhile, the active object database management unit 240 may analyze user information through the analysis unit 260, create a learning model corresponding to the database constructed by performing an attribute information process corresponding thereto and a learning process based on the user information, and perform an expression item providing process based on the learning model, and this will be described below more specifically.

Figure 6:
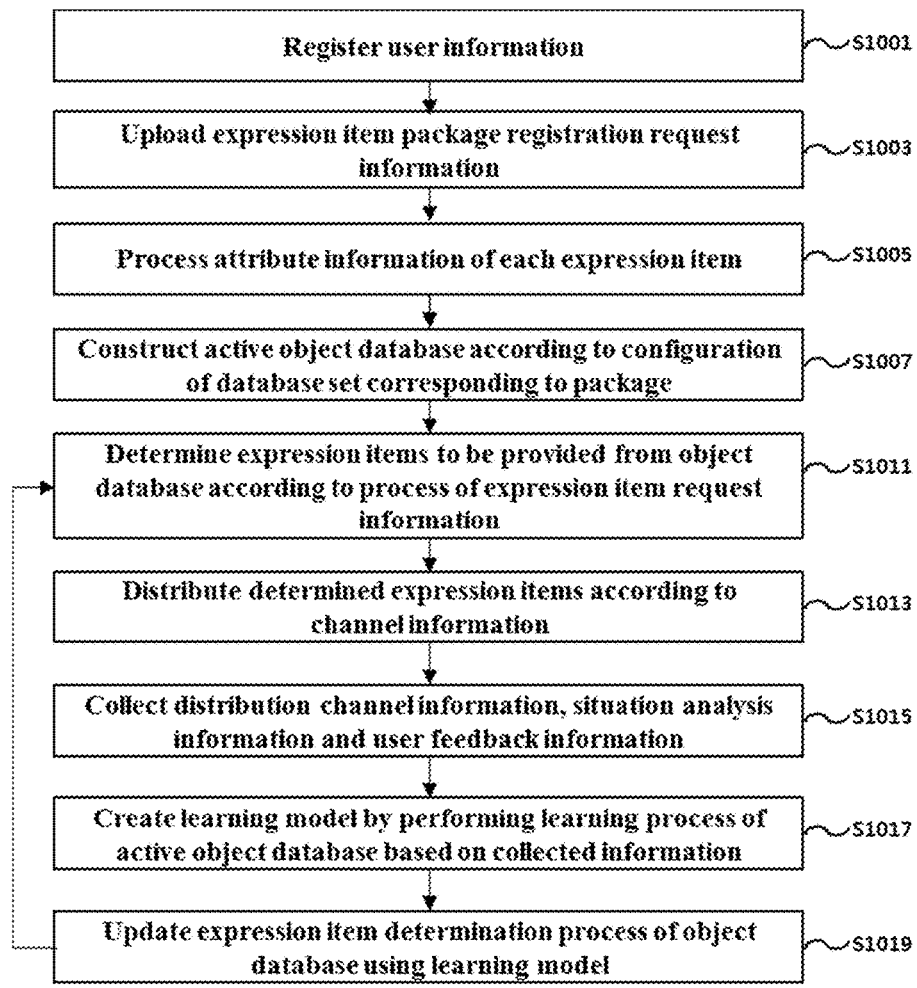
FIG. 6 is a flowchart illustrating a database construction method according to an embodiment of the present invention.

FIG. 6 is a flowchart illustrating a database construction method of a service providing apparatus 200 according to an embodiment of the present invention.

Referring to FIG. 6, first, the service providing apparatus 200 registers user information through the user information management unit 227 (step S1001), and the user uploads package registration request information for registration of expression items on the item registration processing unit 220 (step S1003).

Accordingly, the service providing apparatus 200 processes attribute information for each expression item through the item registration processing unit 220 (step S1005) and determines an active object database for each expression item or constructs a new object database through the active object database management unit 240 (step S1007).

Then, the service providing apparatus 200 determines expression items that will be provided from the object database or a combination of these according to information processing of an expression item request requested in response to a user message identified by the expression item providing unit 230 (step S1011).

In addition, the service providing apparatus 200 distributes the determined expression items to the user terminal 100 according to channel information previously determined by the active object database management unit 240 (step S1013).

Then, the service providing apparatus 200 may collect distribution information (distribution channel information, distribution determination information, distribution field information, etc.), situation analysis information, dialog information, expression item information and user feedback information through the analysis unit (step S1015), and the active object database management unit 240 may create a learning model by performing a learning process of the active object database on the basis of the collected information (step S1017), and update the expression item database configuration and determination process of the active object database management unit 240 using the created learning model (step S1019).

Figure 7:
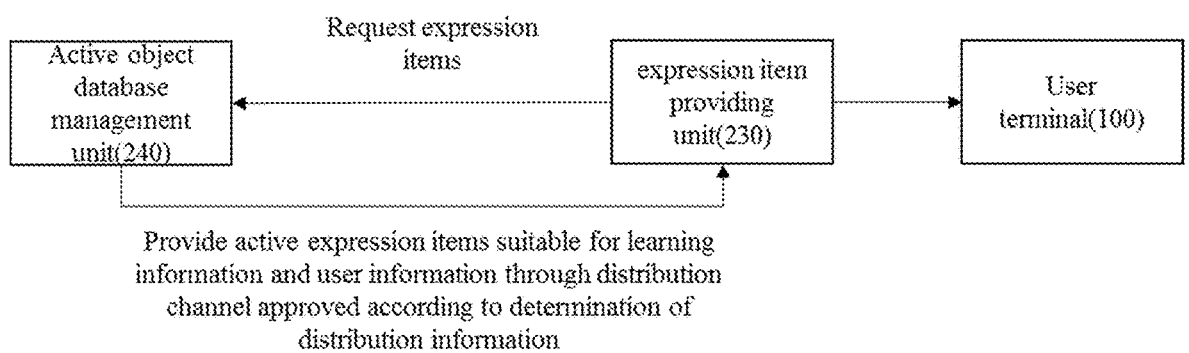
FIG. 7 is a block diagram describing an expression item providing system using a database according to an embodiment of the present invention.

FIG. 7 is a block diagram describing an expression item providing system using a database according to an embodiment of the present invention.

Referring to FIG. 7, the active object database management unit 240 according to an embodiment of the present invention may determine expression items corresponding to the distribution information requested by the expression item providing unit 230. In addition, the active object database management unit 240 may actively determine active expression items suitable for the distribution information, considering learning information of a previously learned learning model, user profile information, and user environment information.

Here, the distribution information may include distribution channel information, and diverse channel forms of the distribution channel may include diverse media and interfaces such as API, SDK, web, app, server, user, machine and the like, and a channel distributed through another application server performing a separate operation process may also be considered.

Figure 8:
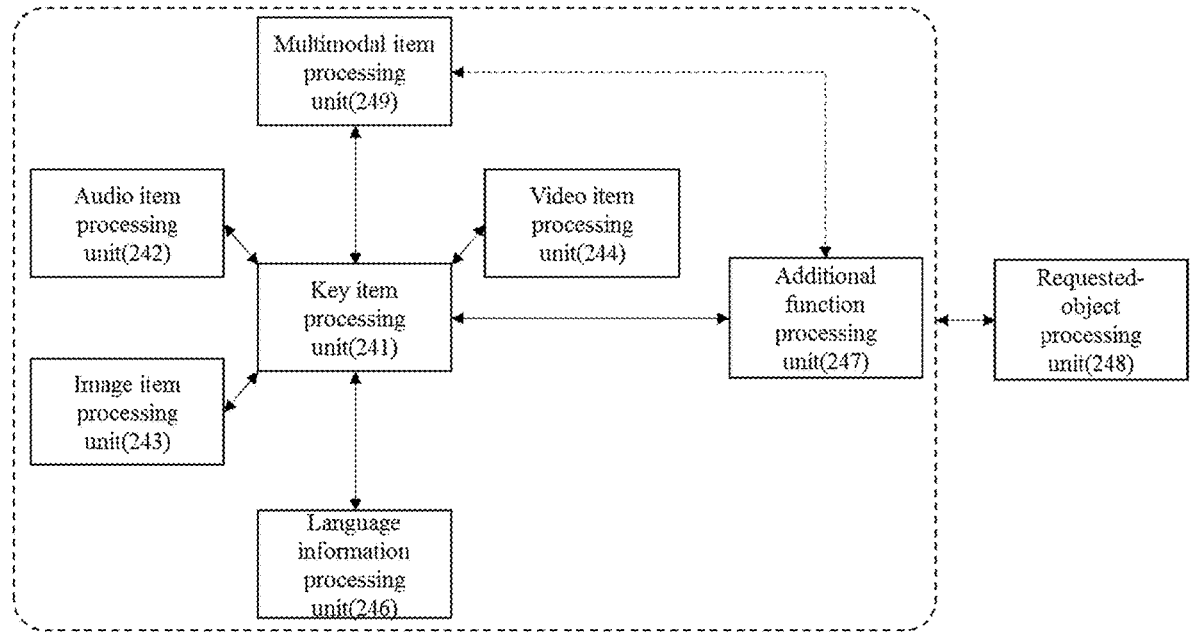
FIG. 8 is a block diagram more specifically describing an active object database management unit according to an embodiment of the present invention.

FIG. 8 is a block diagram more specifically describing an active object database management unit according to an embodiment of the present invention.

Referring to FIG. 8, the active object database management unit 240 includes a key item processing unit 241, an audio item processing unit 242, an image item processing unit 243, a video item processing unit 244, a language information processing unit 246, an additional function processing unit 247, and a multimodal item processing unit 249, and may associate, structure, store and manage the diverse items described above, and process to call an expression item object requested by the expression item providing unit 230 and provide the object to the user terminal 100 through a requested-object processing unit 248.

The key item processing unit 241 stores and manages key information corresponding to the expression items, and the key information may be used as a top-priority call value for providing an expression item data set corresponding to the request object or call values based on learning data.

In addition, the requested-object processing unit 248 may process to determine an active expression item object according to the distribution information, the situation information, and the personalized user information by calling other item processing units 242, 243, 244, 245, 247 and 249 associated with the key item processing unit 241 which matches expression items to the requested expression item information.

To this end, the requested-object processing unit 248 may process to provide situation-adaptive diverse items and combinations thereof to the user terminal 100 or a server, by determining representative values by situation, preference and user information represented in an expression item set grouped according to database association and determining proper expression items on the basis of the representative values, not simply matching only the key information in the first place.

Figure 9:
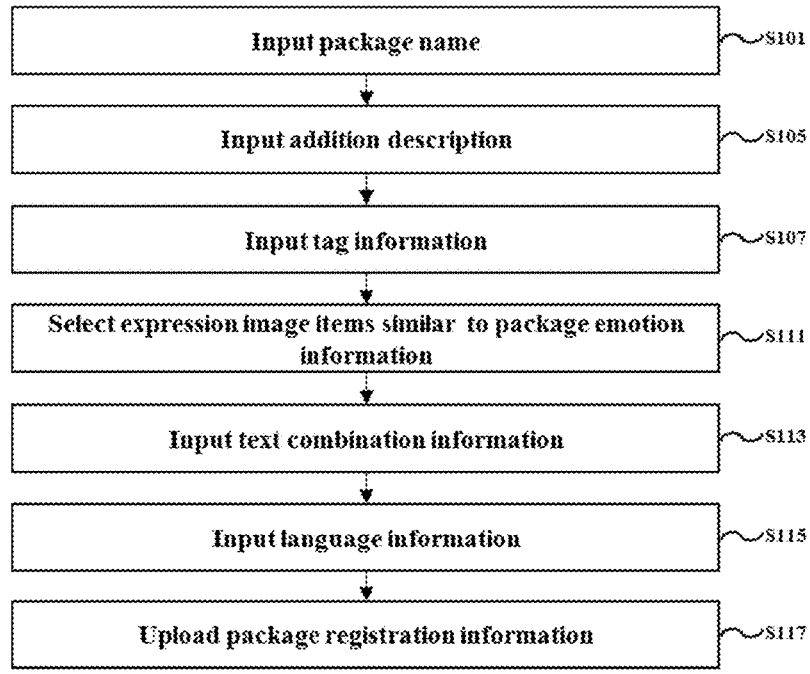
FIG. 9 is a flowchart illustrating the operation of an item package registration interface according to an embodiment of the present invention.
Figure 10:
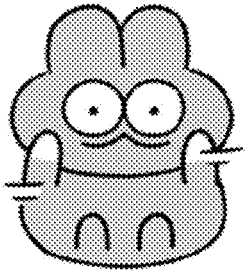
FIGS. 10 to 12 are exemplary views showing a registration interface provided to a user terminal for registration of item packages and related information.
Figure 11:
Figure 12:
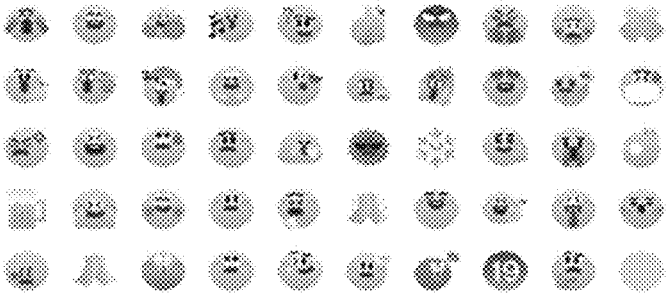

FIG. 9 is a flowchart illustrating the operation of an item package registration interface according to an embodiment of the present invention, and FIGS. 10 to 12 are exemplary views showing a registration interface provided to a user terminal for registration of item packages and related information.

Referring to FIGS. 9 to 12, since the service providing apparatus 200 may provide the user terminal 100 with a registration interface for registration of an expression item package, first, the user may input a package name of expression items through the registration interface (step S101), input additional description (step S105), and input tag information (step S107) as shown in FIGS. 10 to 12.

In addition, as shown in FIGS. 10 to 12, the user may determine an expression item package registration data through the user terminal 100 or a server, and a process of selecting similar expression items corresponding to package emotion information of the expression item package registration data may be performed (step S111).

In addition, the user may input combination information between the expression items and text, and corresponding language information (steps S113 and S115), and process a package registration request to the registration processing unit 220 of the service providing apparatus 200 through a final registration information upload (step S117).

Although registration of expression items is shown in FIGS. 10 to 12 as an example, the same registration process may be performed in processing expression audio items, video items and addition functions.

In addition, although it is described in an embodiment of the present invention that expression items are registered in the form of a package, the present invention is not restricted by the form of combination thereof, and the expression items may be individually registered according to various forms and combination methods, such as an expression package item, an expression key item, an expression total item, and an expression group item.

In addition, more specifically, referring to FIG. 12, an emotion information and language registration interface for registering expression items may be provided to the user terminal 100, and the user may select and register one or more emotion information expressing emotion of the expression items or expressing emotion similar thereto and may register language information corresponding thereto. In addition, the user may register emotion information of a form combining a plurality of emotions and may also set priority information for each emotion information. Accordingly, appropriate emotion information may be registered in correspondence to the expression items.

Figure 13:
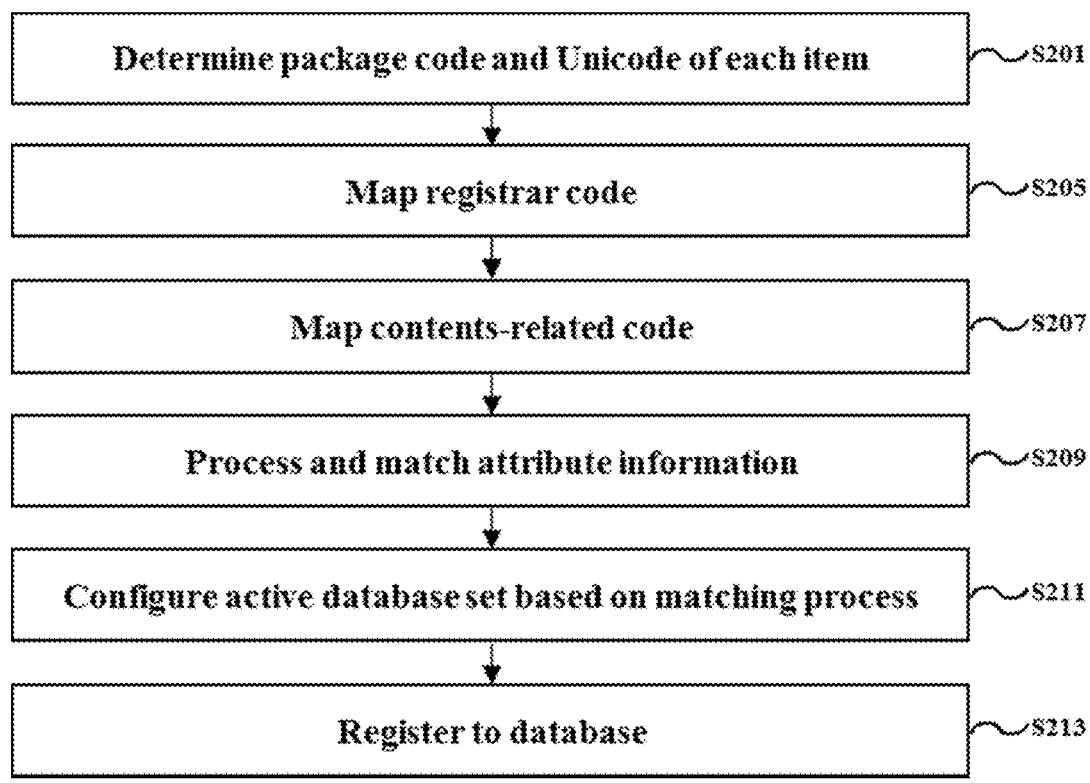
FIG. 13 is a flowchart illustrating a database registration process according to an embodiment of the present invention.
Figure 14:
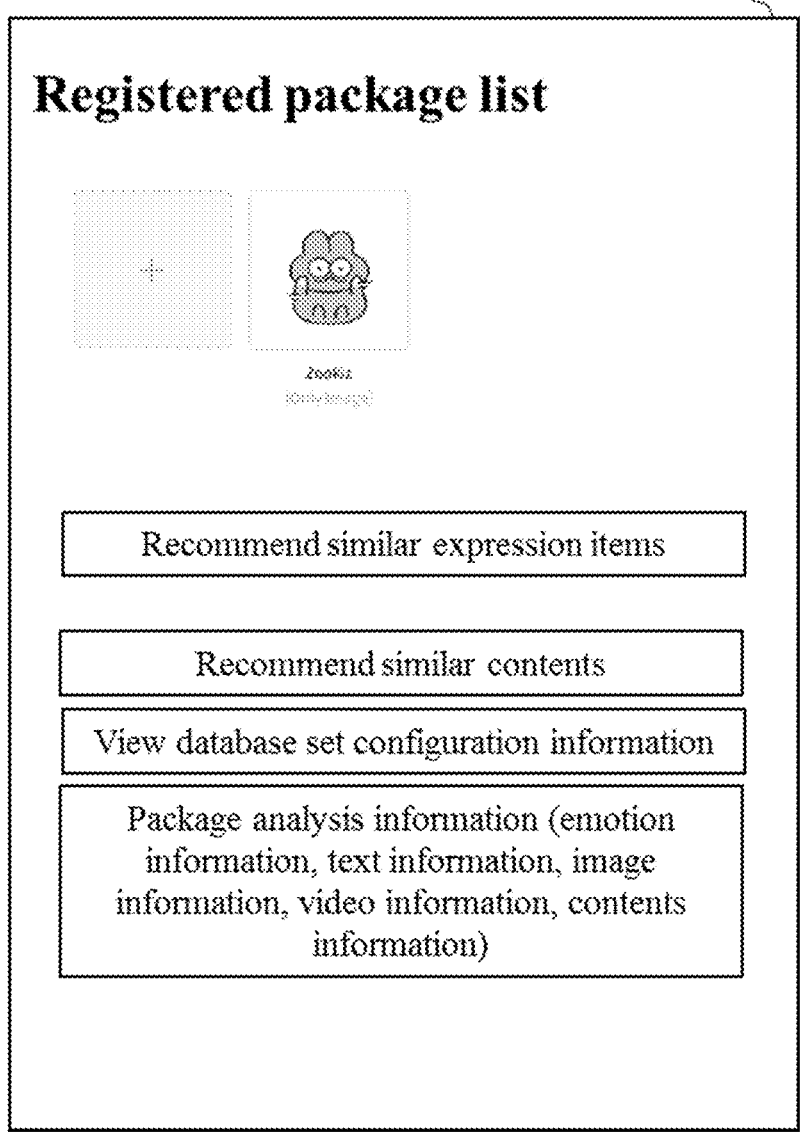
FIG. 14 is a view showing an example of an expression package information interface according to an embodiment of the present invention.

FIG. 13 is a flowchart illustrating a database registration process according to an embodiment of the present invention, and FIG. 14 is a view showing an example of an expression package information interface according to an embodiment of the present invention.

Referring to FIG. 13, the service providing apparatus 200 according to an embodiment of the present invention determines a package code and a single code of each item through the registration processing unit 220 (step S201) and maps a registrar code and a contents-related code on the basis of user information (steps S205 and S207).

In addition, the service providing apparatus 200 may perform a key item matching process according to attribute information processing of the registration processing unit 220 through the active object database management unit 240 (step S209), configure an active database set based on the matching process (step S211), and register and store the active database set in the database 250 according to completion of the configuration (step S213).

However, the present invention is not limited by the above sequence, and the step of configuring the active database set (step S211) may be performed after the step of registering and storing the active database set in the database 250 (step S213), or the two steps may be performed simultaneously.

Accordingly, an expression package information interface as shown in FIG. 14 may be provided to the user.

Particularly, referring to FIG. 14, the active object database management unit 240 may provide the user with an expression package list and, at the same time, perform a process of providing similar expression item recommendation information in response to a user request, providing similar contents recommendation information, providing database set configuration information, and providing package analysis information according to a matching process, to provide the user terminal 100 or a server with the information. The package analysis information may include, for example, emotion information, text information, image information, video information, or other contents information matching according to attribute information processing.

Figure 15:
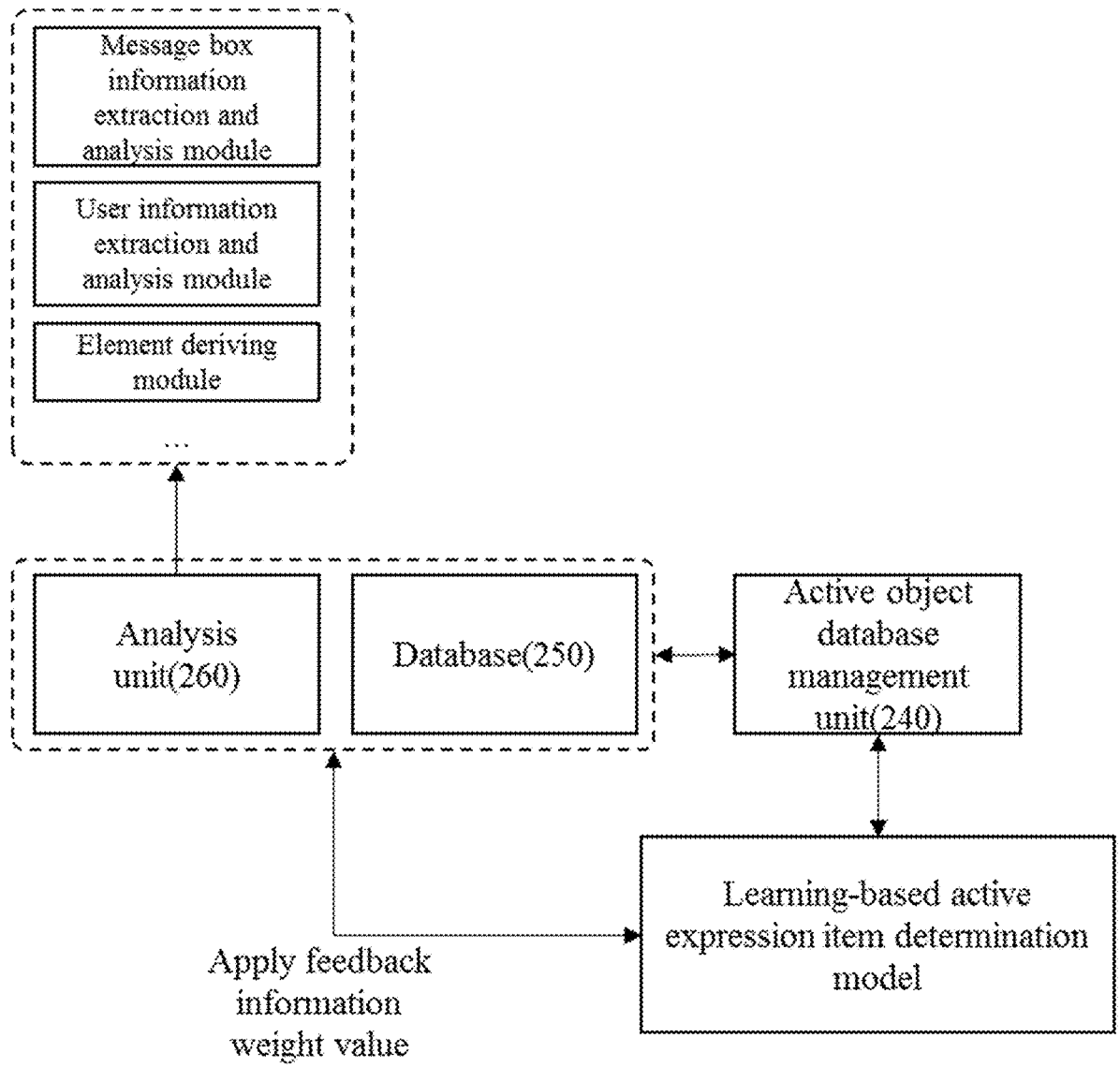
FIG. 15 is a view describing a learning-based active item determination model creation process according to an embodiment of the present invention.

FIG. 15 is a view describing a learning-based active item determination model creation process according to an embodiment of the present invention.

Referring to FIG. 15, the active object database management unit 240 according to an embodiment of the present invention may construct a learning-based active expression item determination model by applying a feedback information weight value according to analysis information of the analysis unit 260, construct a database more suitable for the user and the provided environments by performing a process of providing expression items using the constructed model, and provide suitable expression items.

To this end, first, the active object database management unit 240 may process to create an initial learning model by processing first machine learning of the expression item database 250 based on initial attribute information registered in the database 250, and store the created learning model in the database 250.

Here, the learning-based active expression item determination model may be a learning model for receiving user information and distribution environment information as attribute information processed by the attribute information processing unit 223 and outputting priority determination information of expression items that will be extracted from the database.

In addition, the active object database management unit 240 may enhance accuracy of the learning-based active expression item determination model and reflect a situation and personalization tendency of the user by processing second machine learning by applying a weight value according to user selection information, feedback information and the like analyzed by the analysis unit 260.

For example, the active object database management unit 240 may perform a process of learning the distribution information for determining the priority of expression items to be provided, and the distribution information may represent condition information for determining a distribution field, a distribution channel and a distribution priority. For example, the distribution information may include filtering condition information, harmful DB exclusion fields such as a children app field and the like, previously determined registration mismatch conditions, and determination conditions of each user information for determining a priority, such as minor field assignment condition information and the like.

Then, the active object database management unit 240 may store and manage association information among the items according to the determination of the user on the basis of a numerical value such as distance information, and the active object database management unit 240 may perform continuous weight value application management according to a feedback learning process according to selection and determination of the user and may process learning to reflect more accurate matching and feedback according thereto.

One or more processing methods may be used in the learning algorithm for the learning process, and for example, a method of performing prior learning by applying input variables and target variables to a plurality of machine learning algorithms and a plurality of combinations of machine learning algorithms, and determining an optimum machine learning algorithm or an optimum combined machine learning algorithm considering at least one among the accuracy of each algorithm according to a learning result, a computation time with respect to accuracy, a performance ratio, and fitness of the model.

The learning process may use, for example, a ridge regression analysis, a logistic regression analysis, a generalized linear model, a random forest, a gradient boosting model, a unigram model, a bigram model, an N-gram Model, a neural network or the like.

When a neural network learning process is used, for example, to update distance learning information between the expression items in each package and the key information, the active object database management unit 240 may perform a process of creating a predicted value of the distance between expression items and a learning process for updating the weight value of connection to minimize the difference between the predicted value and the actual user selection information value (backpropagation). To this end, the active object database management unit 240 may learn information on the optimal expression item database combination corresponding to the inclination of the user, a distribution situation and a message keyword by using a gradient descent method or the like as a method of finding a weight value that minimizes the difference between an actual value and a predicted value by repeating a process of moving the weight value little by little to the slope direction after performing partial derivative on the cost function with respect to the weight value.

In addition, as the active object database management unit 240 constructs a learning process-based expression item database, the attribute information processing unit 223 may also perform an adaptive process for supporting the learning process.

For example, the active object database management unit 240 may determine attribute information that is efficient for constructing the learning-based active expression item determination model, and transfer a learning-based attribute information request corresponding thereto to the attribute information processing unit 223.

Accordingly, as the attribute information processing unit 223 extracts and processes attribute information corresponding to the learning-based attribute information request, attribute information reflecting the learning contents is acquired and processed, and an expression item database and a learning model thereof, and a learning-based expression item providing system can be efficiently constructed.

Meanwhile, the analysis unit 260 may process to provide more abundant expression items and a message interface by analyzing a message by mounting or utilizing various analysis modules, and providing analysis information corresponding thereto to the active object database management unit 240 or to another module through the control unit 210.

To this end, the analysis unit 260 may include a message box information extraction and analysis module, a user information extraction and analysis module, and an element deriving module.

The message box information extraction and analysis module performs a function of extracting and analyzing information included in the message box of a user using a chatting service, through the user terminal 100 or a server.

At this point, the message box information may include text information and expression item information inputted by the user, and the message box information extraction and analysis module may perform dialog context analysis on the whole message box when the message box information is analyzed, and the user himself or herself may specify a range to analyze the dialog context, or the service providing apparatus may automatically recognize a range and analyze the dialog context.

The user information extraction and analysis module performs a function of extracting and analyzing information on the user using a chatting service through the user terminal 100 or a server. At this point, the user information may include at least user profile picture information, user gender information, user state notification speech information and the like.

The element deriving module may derive, by utilizing a separate machine learning apparatus or the like, elements that will be inputted into an expression item creation learning engine from the text information, the expression image item information, and the user information extracted and analyzed by the message box information extraction and analysis module and the user information extraction and analysis module. At this point, the elements may include attribute information of each element, and the attribute information of each element may include, for example, text information, expression type information, image type information, image information matching to expression, information on the number of use of each of a plurality of users, image information matching to the user information, feedback processing information and the like.

At this point, a plurality of expression items derived from the element deriving module described above may be learned by utilizing machine learning using the analysis unit, various analysis models or the preprocessor.

Here, each of the modules may be implemented by processing of a program language code or implemented by combination of software and hardware capable of performing complex operations using a device, a system or the like. In addition, the module configuration and operation of the analysis unit 260 will be described below in FIG. 24 in further detail.

FIGS. 16 to 22 are exemplary views describing expression item providing methods on a message interface, which is provided to a user terminal 100 or a server according to an embodiment of the present invention.

Referring to FIGS. 16 to 22, the service providing apparatus 200 may provide recommended expression items corresponding to a message inputted by the user through the user terminal 100, for each item database or compositely.

In addition, the recommended expression items may be outputted on the message interface of the user terminal 100 in various methods associated with the message box. For example, the recommended expression items may be outputted to be directly exposed at a specific position on the display of the user terminal 100, outputted to be exposed at an inner position of the message box, or outputted to be exposed at an outer position of the message box.

In addition, since the form or the order of providing the recommended expression items may be determined in unrestricted various methods, representative recommended expression items may be sequentially provided one by one, or a plurality of recommended expression items may be provided to be included in a recommended expression item box.

Since this may be freely determined by setting of the user terminal 100 and the service providing method of the service providing apparatus 200 for diversity and accurate transfer of dialog, it allows communication of an advanced form. Accordingly, FIGS. 16 to 21 only show examples of an interface according to an embodiment of the present invention, and message interfaces having more diverse combinations may be additionally configured and provided by the provision and selection of the recommended expression items according to an embodiment of the present invention.

Figure 16:
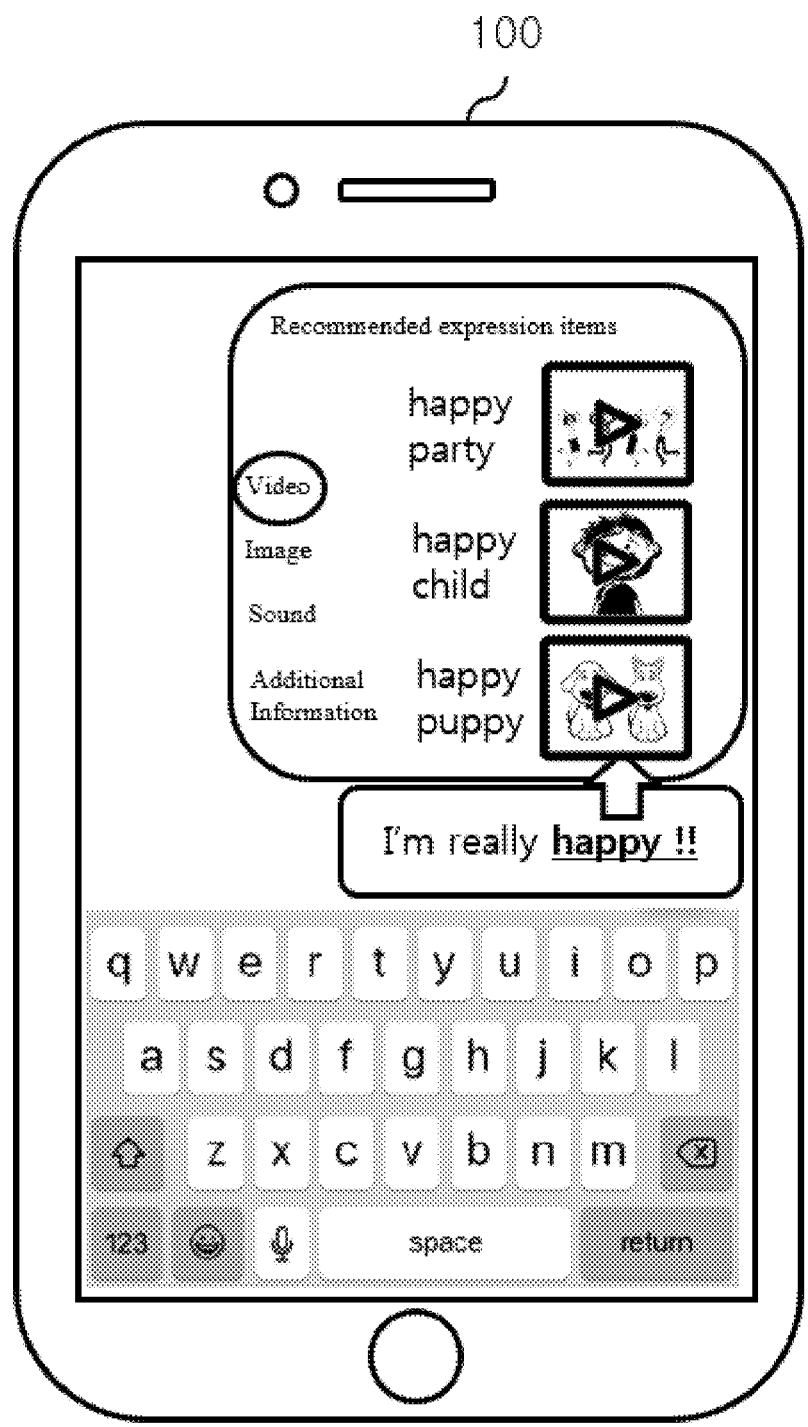
FIGS. 16 to 21 are exemplary views describing expression item providing methods on a message interface, which is provided to a user terminal according to an embodiment of the present invention.

FIG. 16 is a view showing an expression image item providing interface according to an embodiment of the present invention, and the service providing apparatus 200 may process to determine expression image items corresponding to an inputted message keyword in correspondence to the user profile and the distribution information, and selectively output recommended image items according thereto through the user terminal 100.

Figure 17:
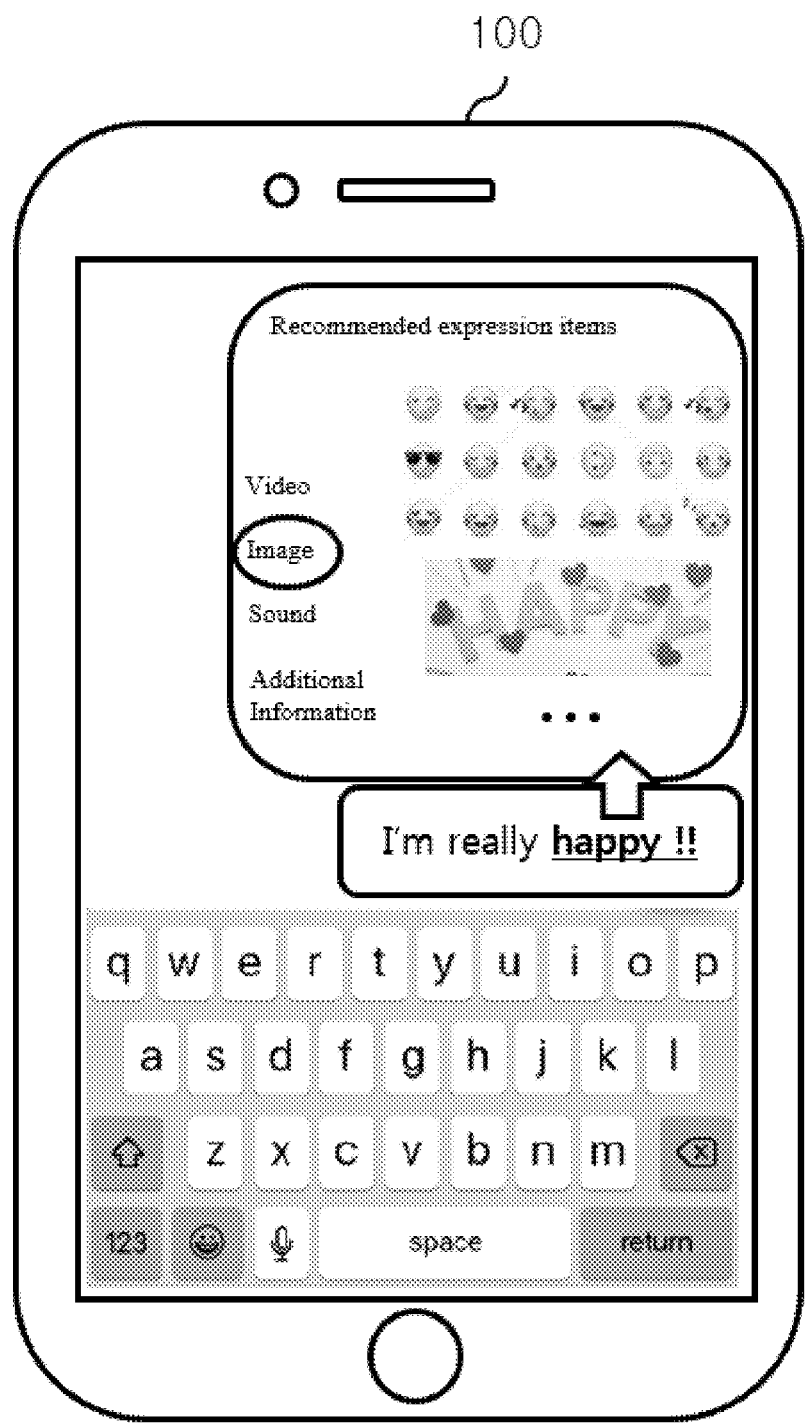

In addition, FIG. 17 is a view showing an expression item providing interface according to an embodiment of the present invention, and the service providing apparatus 200 may process to determine expression items corresponding to an inputted message keyword in correspondence to the user profile and the distribution information, and selectively output recommended items according thereto through the user terminal 100. Here, the recommended expression items may be provided as individual images or in the form of an expression item collection grouping various recommended expression items, and this may be determined according to setting of the user terminal 100 or the service providing method of the service providing apparatus 200.

Figure 18:
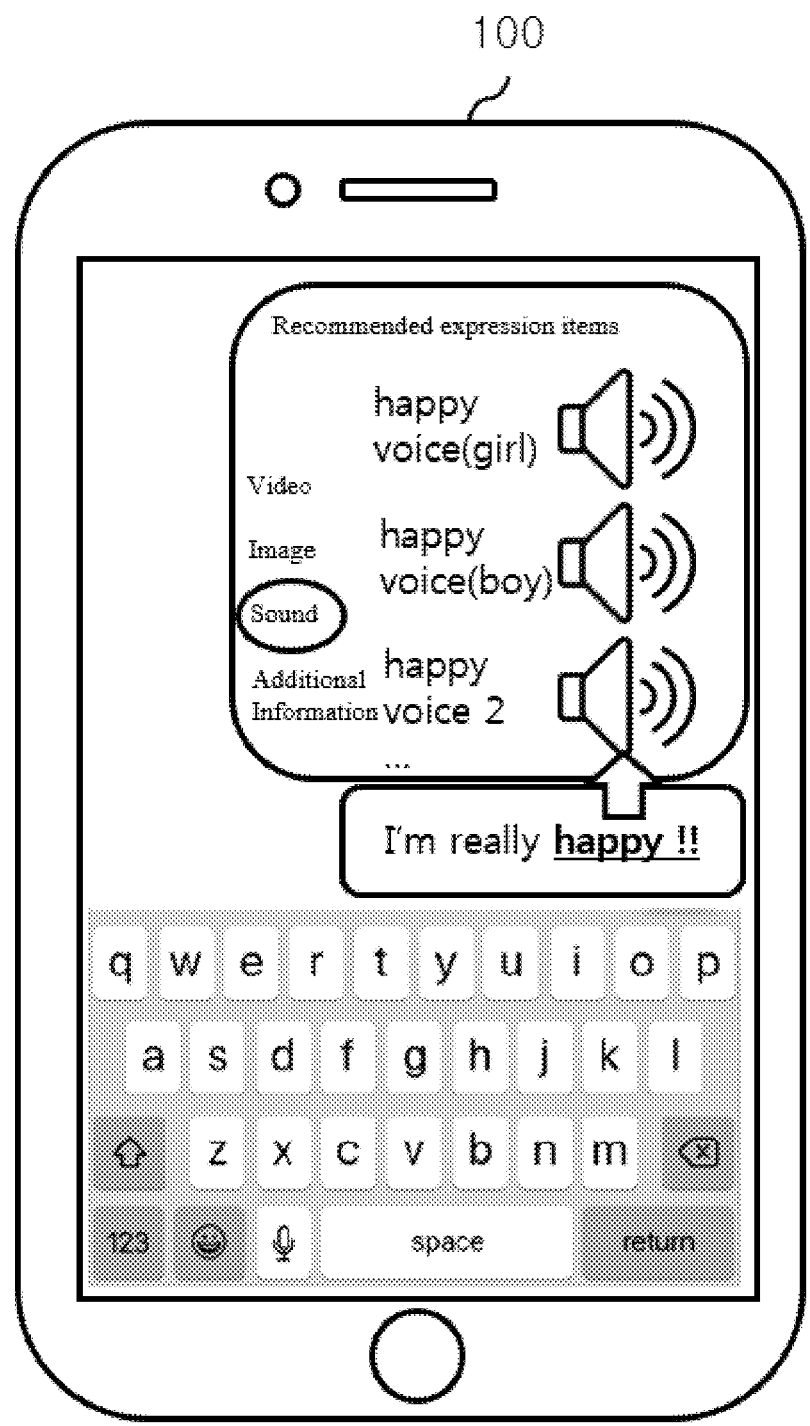

In addition, FIG. 18 is a view showing an expression audio item providing interface according to an embodiment of the present invention, and the service providing apparatus 200 may process to determine expression audio (sound) items corresponding to an inputted message keyword in correspondence to the user profile and the distribution information, and selectively output recommended items according thereto through the user terminal 100.

Figure 19:
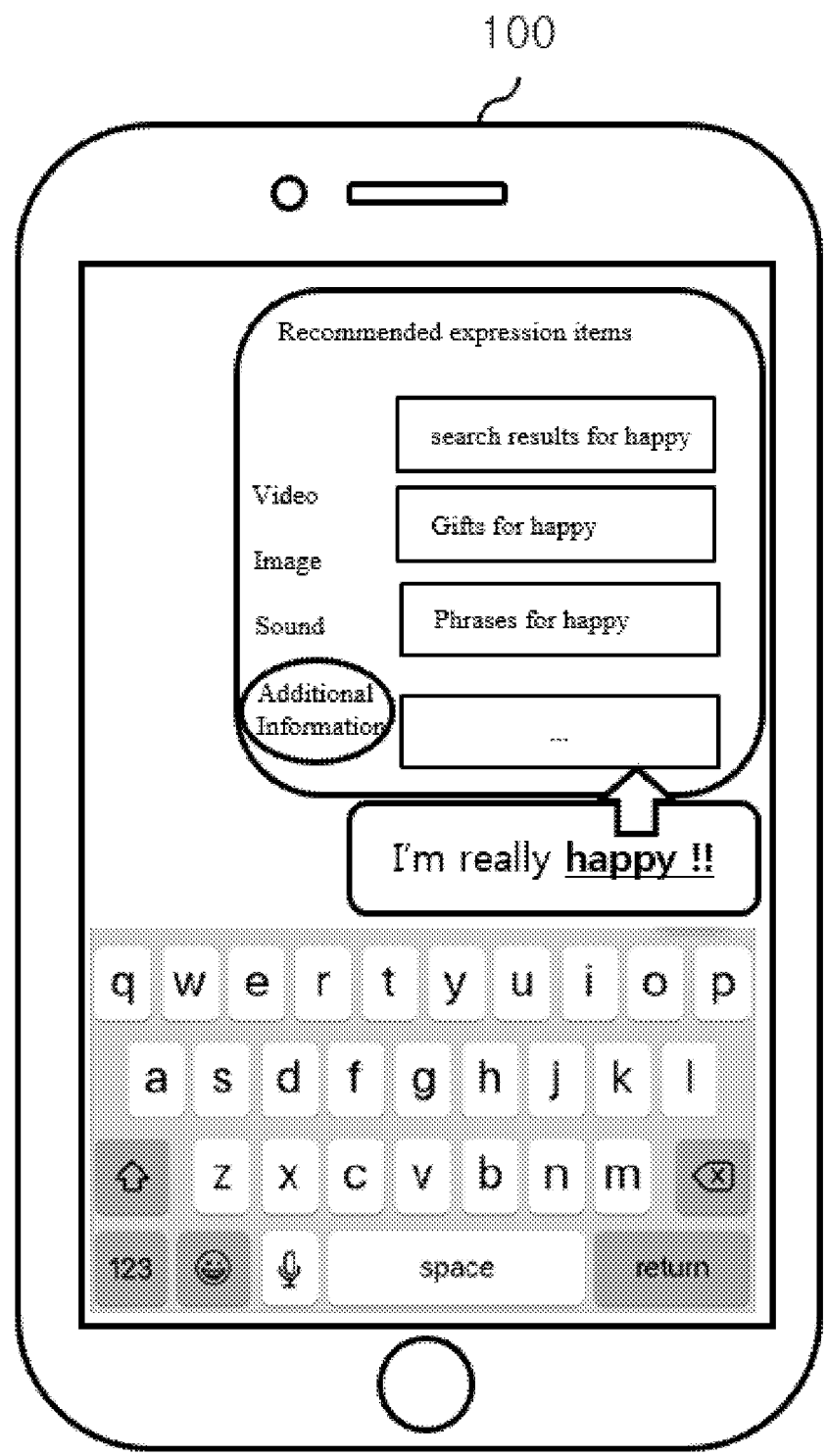

Meanwhile, FIG. 19 is a view showing an expression additional function providing interface according to an embodiment of the present invention, and the service providing apparatus 200 may process to determine additional function items (e.g., related search results, related products, related famous phrases, etc.) corresponding to an inputted message keyword in correspondence to the user profile and the distribution information, and selectively output recommended additional function items according thereto through the user terminal 100.

Here, the additional function items may be associated with additional functions provided through a third service providing apparatus (e.g., a third-part server or the like) separated from the service providing apparatus 200. For example, a function of providing a result of related search corresponding to a message keyword from a third-party server, providing related product information, providing related famous phrases, or providing braille information may be associated with the additional function items. The additional function items may be implemented as a display item performing a function of an associative execution button for providing the additional function items through the user terminal 100 in association with a service function of a third-party service providing apparatus like this.

Figure 20:
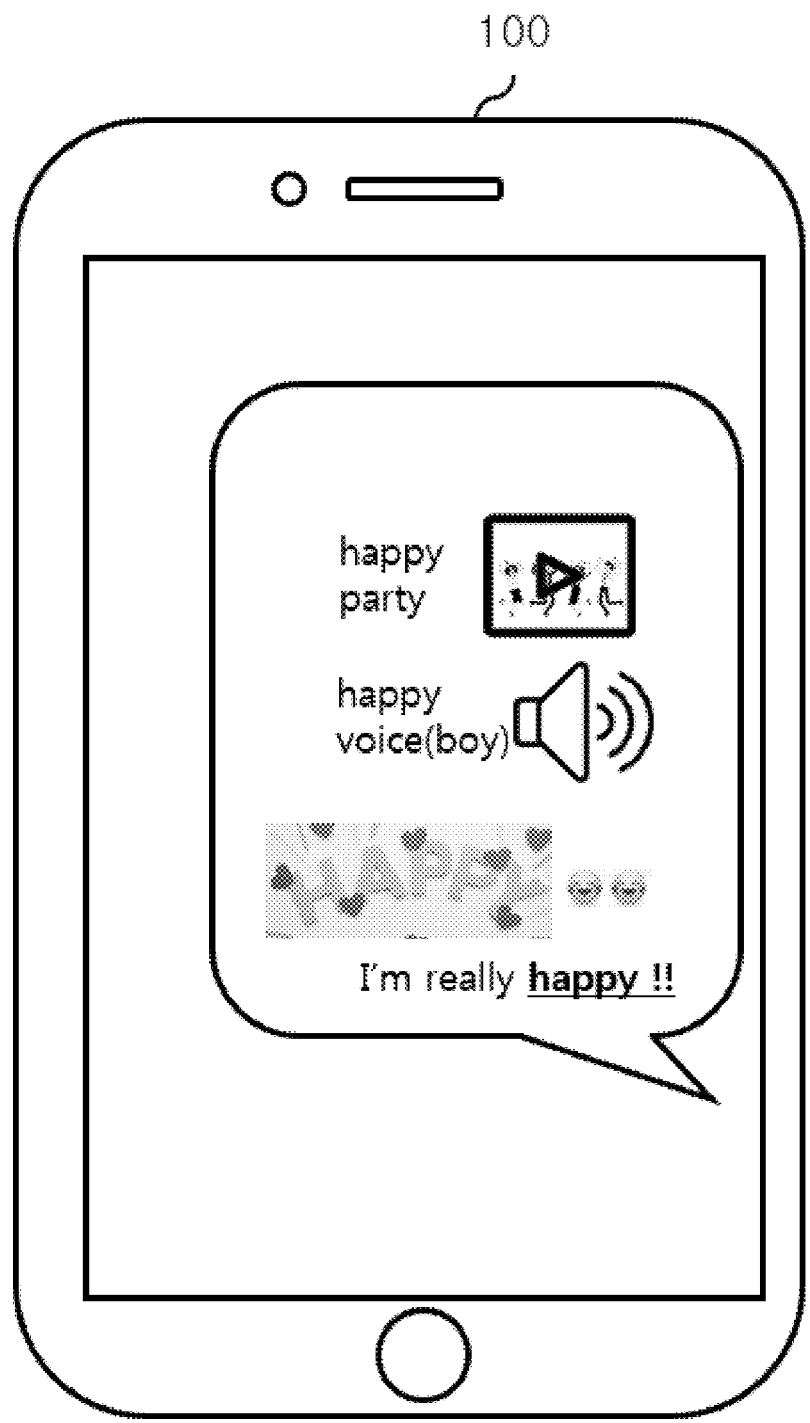

In addition, FIG. 20 is a view showing expression items compositely processed through the active object database management unit 240 and outputted through the message interface according to an embodiment of the present invention. Since the service providing apparatus 200 processes to configure an item set including expression video items, expression audio items, expression items and additional function items determined and combined by selection of recommended expression items as shown in FIGS. 16 to 19 and to provide an expression item set combining the items to the user terminal 100 or a server in correspondence to an inputted message keyword, it can be processed to provide expression items that are more abundant, diverse and suitable for the user.

Figure 21:
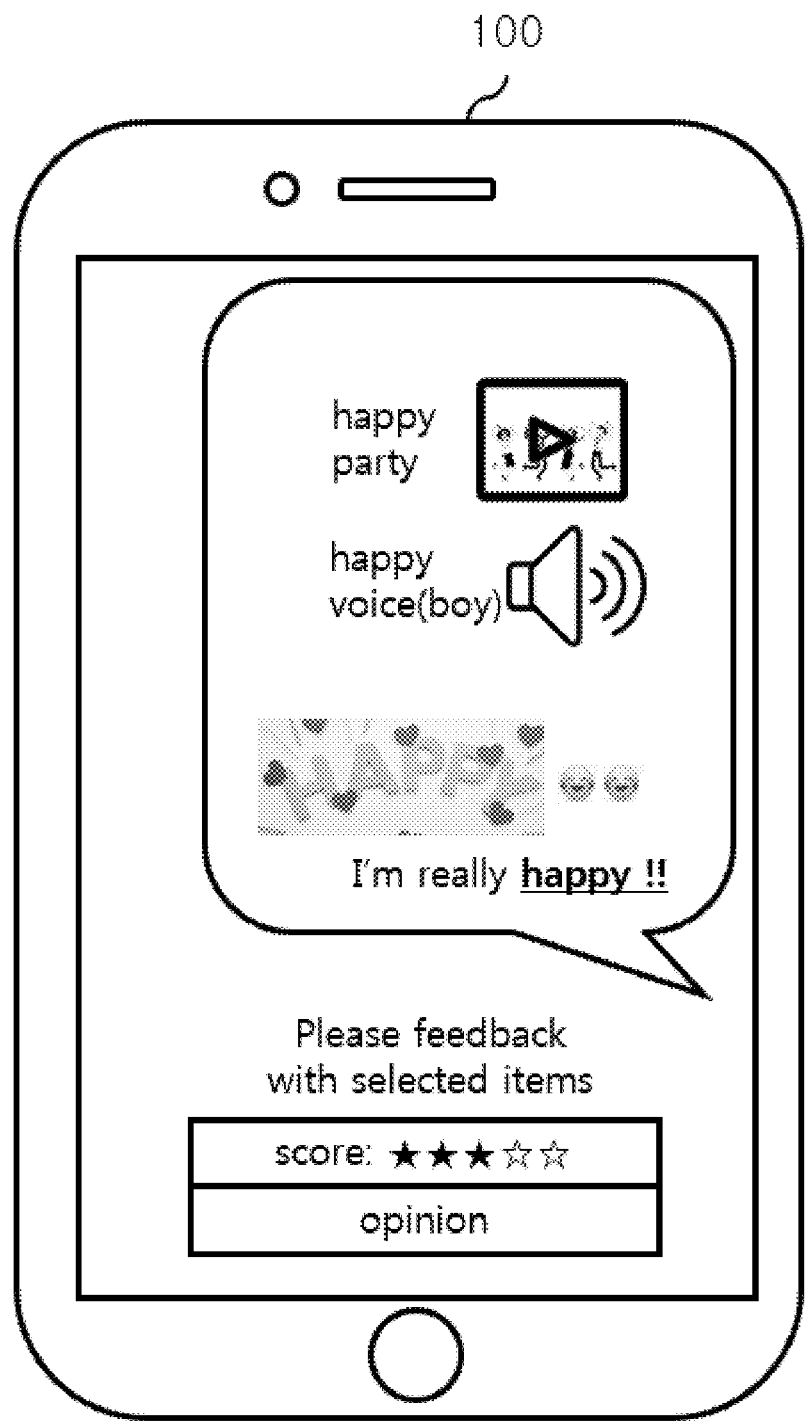

In addition, FIG. 21 is a view showing input of user feedback information through a message interface, and since the user feedback information like this may include feedback information of individual users, it may be used for evaluating or reporting evaluation information corresponding to expression items, and may be used for feedback information analysis that will be reflected to a learning process.

Particularly, as the analysis unit 260 analyzes the inputted user feedback information and the active object database management unit 240 performs a learning process according thereto, it may be processed to determine more accurate expression items.

Figure 22:
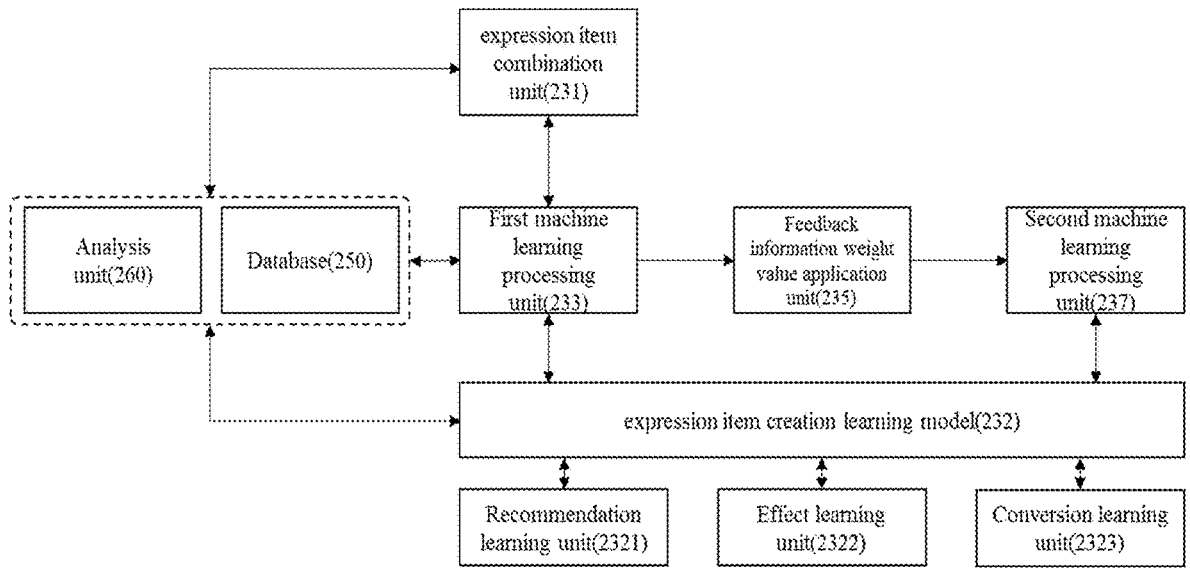
FIG. 22 is a view describing a process of learning, providing and combining expression items on the basis of message analysis according to an embodiment of the present invention.

Meanwhile, FIG. 22 is a view describing a process of learning, providing and combining expression items on the basis of message analysis according to an embodiment of the present invention.

More specifically, the expression item providing unit 230 according to an embodiment of the present invention may perform recommendation learning, effect learning, and conversion learning processes of appropriate expression items on the basis of a machine learning process using element classification information and expression item information of the expression items, registration information, setting information, and tagging and learning information as input values. The expression item providing unit 230 according to an embodiment of the present invention may perform determination of recommended items, determination of an effect, determination of conversion and creation of combination-type expression items according to analysis of the analysis unit 260, and provide a message service which uses the combination-type expression items or the determined expression items.

To this end, the expression item providing unit 230 includes an expression item combination unit 231, a first machine learning processing unit 233, a feedback information weight value application unit 235, and a second machine learning processing unit 237, and an item creation learning model 232 created by machine learning may be constructed through the database 250.

The first machine learning processing unit 233 processes to create an initial expression item learning model by processing first machine learning of the expression item database 250 based on the classification management information of the active object database management unit 240, and store the created expression item creation learning model 232 in the database 250.

Here, the item creation learning model may include a learning model for deriving a setting information matching algorithm for recommendation, determination of an effect, conversion and combination of expression items, include classification information of the items as an input variable, and include combination setting information for combination of expression items as an output variable. The combination setting information may include information on the combination among the elements and may include at least one among arrangement type information, grid position information, scale ratio information, semantic combination information, keyword combination information, preference information, and setting information of a first expression item and a second expression item, which are combination targets.

Accordingly, the expression item creation learning model 232 may further include a recommendation learning unit 2321, an effect learning unit 2322 and a conversion learning unit 2323.

More specifically, for example, according to an embodiment of the present invention, when an item recommended by the recommendation learning unit 2321 is a two-dimensional expression item data, the expression item creation learning model 232 may further perform a three-dimensional conversion process for converting the two-dimensional item into a three-dimensional item by assigning a sense of three-dimensional distance and a sense of reality through a conversion process, such as addition of effects based on a value set by the effect learning unit 2322 or addition of shades processed by the conversion learning unit 2323.

For example, the expression item creation learning model 232 may determine a modeling condition of a condition for learning and perform a three-dimensional conversion learning process corresponding to two-dimensional expression items according to information for classifying two-dimension, three-dimension, augmented reality (AR) or virtual reality (VR) acquired from the item classification information, on the basis of the analysis information of the analysis unit 260 and attributes, registration information, setting information, and tagging and learning information of the expression item to be created.

More specifically, the learning process of the expression item creation learning model 232 according to an embodiment of the present invention may include a process of enhancing a sense of reality according to determination of a color control variable and a shade control variable for three-dimensional conversion learning about the combination of two-dimensional expression items.

The expression item information used for these combination and learning may include shade creation information for creating three-dimensional expression items, and the shade creation information may include at least one among inner area information, outer area information, surrounding area information, contact area information, curved-line information, subject reflection distance value control information, darkness information, and shade thickness setting information.

In addition, the expression item creation learning model 232 may include a multimedia ability enhancing process for determining an item to be matched in the first place among other expression items, video items and sound items that will be matched to an expression item.

Accordingly, it is possible to perform a composite call and combining process of expression items matching the combination-type expression item created by the expression item creation learning model 232.

In addition, the expression item creation learning model 232 may perform a feedback learning process according to the call and combination and perform a learning process applying a similar model corresponding thereto.

In addition, in learning, the expression item creation learning model 232 may perform an environment learning process corresponding to diverse user environments, such as learning of applying multimedia information, learning of a sound time, learning of image background information, or learning a dialog environment learning such as a theme.

In addition, the analysis unit 260 may analyze scores and conditions of applying a learned dialog environment, and a suitable expression item or a combination of expression items may be determined according to a result of the analysis and recommended to the user through the object database determination unit 225.

More specifically, the analysis unit 260 may determine expression items to be recommended to the user by performing at least one among a Unicode interpretation analysis and an emotion interpretation analysis from dialog information transmitted and received through the message interface.

Particularly, the analysis unit 260 may process to classify, store and teach a multimedia expression data set that will be used in extended reality and fill an empty slot among DB slots mapped to the data set stored in the active object database management unit 240 with a DB slot corresponding to extended reality in correspondence to the expression item creation learning model 232. For example, the DB slot needed for extended reality may be at least one among an expression image item, an expression video item, and a sound item and may have a format of one or more among tag information, registration information, setting information, label information, token information, and block information that can be interpreted.

In addition, when a DB slot corresponding to extended reality is filled, the analysis unit 260 may perform a learning process based thereon and then reflect the learned information when an expression item is recommended, and the expression item providing unit 230 may distribute the recommended expression item to one among various fields, an API, a SDK, an App, a distribution-related program, and a related server according to the distribution field condition.

Here, the expression item providing unit 230 may implement an input form of a display interface, a dialog window interface and a keyboard interface according to recommendation in correspondence to the multimodal interface, and expression items for an extended reality interface according thereto may be provided to the user terminal 100.

In addition, the analysis unit 260 may perform a learning process of a set device to correspond to various multimodal condition values that will be utilized in extended reality and store learned information in the database 250. As the learned and stored data, setting values corresponding to the multimodal condition values, such as emoticon/sad/31/mojitok/2d/3d/ar/Vr/or emoji/sad/2/apple/2d/ar/, may be set for each device.

In addition, the analysis unit 260 may perform a process of enhancing multimedia ability by analyzing and determining an item to be matched in the first place among other expression image items, video items and sound items that will be matched to a provided expression item.

Accordingly, the expression item providing unit 230 may allow a composite call of an item to be matched in the first place among other expression image items, video items and sound items matched in correspondence to the recommended expression items, and expression image items combined according thereto may be provided.

In addition, the analysis unit 260 may process the combined and provided contents as combined and provided information and apply again the processed information to the expression item creation learning model 232, and a process of applying and learning a similar model corresponding thereto may be performed again.

Learning the combined and provided information may include at least one among multimedia information application learning, sound time learning, image background information learning, and dialog environment learning such as a theme or the like that will be applied, and the analysis unit 260 may determine whether or not to distribute the recommended expression items on the basis of the applied score and condition according to a learned dialog environment.

Meanwhile, one or more processing methods may be used in the machine learning algorithm of the first machine learning processing unit 233, and furthermore, prior learning is performed by applying input variables and target variables to a plurality of machine learning algorithms and a plurality of combinations of machine learning algorithms, and an optimum machine learning algorithm or an optimum combined machine learning algorithm may be determined considering at least one among the accuracy of each algorithm according to a learning result, a computation time with respect to accuracy, a performance ratio, and fitness of the model.

The machine learning algorithm processed in the first machine learning processing unit 233 may use, for example, a ridge regression analysis, a logistic regression analysis, a generalized linear model, a random forest, a gradient boosting model, a neural network or the like.

The ridge regression analysis is a basic linear model and provides additional parameters to handle extreme values or outliers. The logistic regression analysis is a basic linear model, and it is effective to use when a target variable, i.e., a target to be predicted, shows a binomial distribution. The generalized linear model is a basic linear model, and it is effective to use when a target variable shows a Poisson distribution. The random forest is an ensemble model, i.e., a model configured by assembling a plurality of decision trees, and each decision tree is individually developed considering associativity of input variables and target variables and is more flexible compared with a higher linear model. The gradient boosting model is also referred to as a generalized boosting model or GBM, and although it is an ensemble model having a tendency similar to that of the random forest, since there is a difference in that each decision tree is developed considering the accuracy of already created decision trees, it is sometimes considered as a model having a high accuracy compared with the random forest.

The neural network is a very flexible model that can predict virtually any target and may handle both linear and nonlinear patterns by adjusting parameters. Therefore, parameter tuning needs to be finely conducted. Particularly, the neural network is a statistical learning algorithm inspired by the neural network of biology in machine learning and cognitive science, and a deep learning method may be implemented by compositely configuring the neural network.

For example, the neural network may include a convolutional neural network (CNN) optimized by accompanying overall FC (Fully Connected), Max Pooling and convolution, and a recurrent neural network (RNN) useful for time-series data.

When a neural network learning process is used, for example, the first machine learning processing unit 233 may perform a process of creating a predicted value of a combination-type item created from the classification information of the item database 250 according to combination setting information, and a learning process for updating the weight value of connection to minimize the difference between the predicted value and the actual classification information value (backpropagation). To this end, the first machine learning processing unit 233 may learn optimal combination setting information similar to the reality by using a gradient descent method or the like as a method of finding a weight value that minimizes the difference between an actual value and a predicted value by repeating a process of moving the weight value little by little to the slope direction after performing partial derivative on the cost function with respect to the weight value.

Meanwhile, the first machine learning processing unit 233 may construct an item creation model for creating items synthesizing expression items, as well as combination setting information, using a generative adversarial network (GAN) learning method spotlighted recently. When the GAN is used, the first machine learning processing unit 233 creates learning data for GAN training from the item classification information and the item data, and a generator and a discriminator based on the learning data are provided to determine similarity between an item data created by the generator and an item actually manufactured by a person using the discriminator, and the first machine learning processing unit 233 may perform a process which enhances accuracy according to the amount of learning data by exchanging information between the generator and the discriminator to create a combined expression item as properly as not to be distinguished from an actually existing production item.

When the first machine learning is processed like this, the expression item combination unit 231 determines a first expression item and a second expression item, which are combination targets, acquires combination setting information calculated in correspondence to the first expression item and the second expression item from the item learning model on which first machine learning has been processed, and creates the combination-type expression item by processing a combination based on the combination setting information.

The expression item combination unit 231 may acquire combination information between the elements of the first expression item and the second expression item from combination setting information acquired from the learned expression item creation learning model 232, and combine element information of the first expression item and the second expression item according to the combination information between the elements and create a combination-type expression item according to the combination.

Here, the combination information between the elements may include at least one among arrangement type information, grid position information, scale ratio information, semantic combination information, and keyword combination information of the first expression item and the second expression item, may include inner area information, outer area information, surrounding area information, contact area information, curved-line information, subject reflection distance value control information, darkness variable information, and shade thickness setting information as shade creation information for three-dimensional conversion, and may further include multimedia matching information and environment information for item matching of other attributes corresponding thereto.

In addition, the created combination-type expression item may be stored in the database 250 and recursively used for the first machine learning process of the first machine learning processing unit 233.

Accordingly, the created combination-type expression item may be stored in the database 250 and provided to the user terminal 100 through the message interface unit 225.

For example, the message interface unit 225 may provide an expression item list including the combination-type expression item through the user terminal 100 and process to include a combination-type expression item selected from the expression item list in a message.

Meanwhile, the active object database management unit 240 may receive feedback information corresponding to the created combination-type expression item from the user terminal 100 and perform a database 250 update process corresponding to the feedback information.

The message interface unit 225 may request feedback information corresponding to the combination-type expression item inputted by the user through the user terminal 100, acquire the feedback information in response to the request, and transfer the feedback information to the active object database management unit 240. Here, the feedback information may include at least one among evaluation information, report information and use rate information of each element of the combination-type expression item.

Meanwhile, the feedback information weight value application unit 235 may process weight value tuning of combination setting information corresponding to a feedback target combination-type item on the basis of at least one among the evaluation information and the use rate information of each element acquired from the feedback information.

In addition, the second machine learning processing unit 237 may update the expression item creation learning model 232 using weight value tuning information of the combination setting information corresponding to the feedback target combination-type expression item, by performing the second machine learning of the expression item learning model using adjusted weight value parameters.

Accordingly, as the combination-type expression item creation algorithm for the user is correctly corrected and learned, a more useful combination-type expression item may be created, and there is an effect of enhancing the use rate of a message service and the use rate of the combination-type expression item according to an embodiment of the present invention.

Meanwhile, the analysis unit 260 may analyze the messages transmitted and received between users through the message interface unit 225 and extract image information, contents information, setting information, additional description information or keywords of a combination-type item, which can be provided in response to the messages.

In addition, the analysis unit 260 may further perform detection of a specific expression, recommendation of an item, provision of an item, analysis of use rate of an item and the like corresponding to the message contents using the information extracted according to the analysis.

For example, the analysis unit 260 may analyze messages acquired by the message interface unit 225 through one or more natural language understanding techniques such as morphological analysis, keyword recognition, speech act analysis, sematic analysis, expression item analysis and the like of the messages according to one or more messages and a message range, confirm a specific emotional expression phrase, i.e., a phrase expressing a specific emotion, extract image information, contents information, setting information, additional description information, keywords or the like corresponding thereto, and recommend or provide at least one or more matching expression items. In addition, the analysis unit 260 may perform an analysis process corresponding to the expression items, extract image information, contents information, setting information, additional description information, keywords or the like corresponding thereto, and recommend or provide at least one or more other matching expression items.

FIGS. 23 to 48 are views describing specific configuration and operation of an analysis unit according to an embodiment of the present invention.

Figure 23:
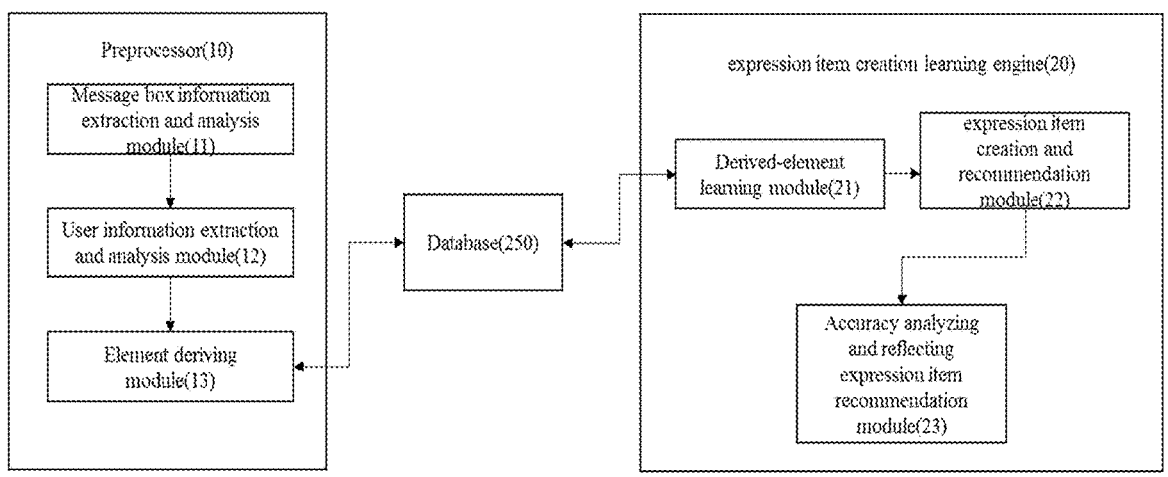
FIGS. 23 to 48 are views describing specific configuration and operation of an analysis unit according to an embodiment of the present invention.

More specifically, referring to FIG. 23, the analysis unit 260 according to an embodiment of the present invention may be configured to include a preprocessor 10, and an expression item creation learning engine 20.

The preprocessor 10 may include at least a message box information extraction and analysis module 11, a user information extraction and analysis module 12, and an element deriving module 13.

The message box information extraction and analysis module 11 performs a function of extracting and analyzing information included in the message box of a user using a message interface service through the user terminal 100. At this point, the message box information may include text information inputted by the user and expression item information.

When message box information is analyzed, the message box information extraction and analysis module 11 may perform dialog context analysis on all or part of the message box. The message box information extraction and analysis module 11 may allow a user to specify a range corresponding to part of dialog context by himself or herself to perform the analysis or may perform the analysis by automatically recognizing a dialog context range.

Figure 28:
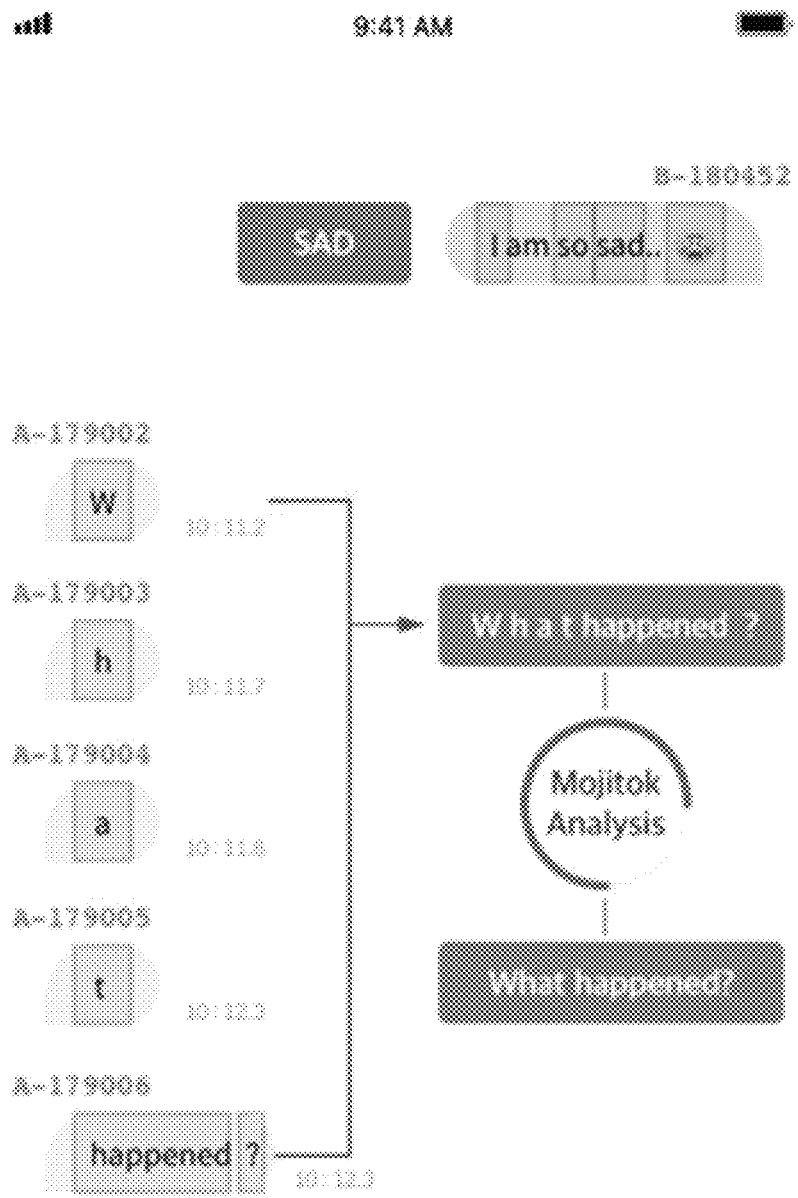

At this point, when the text information and the expression item information included in the message box are analyzed, the message box information extraction and analysis module 11 may analyze the sentence form, emotional symbols, and the time and response time of sending messages by the user and the chatting counterpart, and the message box information extraction and analysis module 11 may grasp through the analysis whether the inputted message is a successive sentence or a sentence transmitted in division, and when the chatting counterpart transmits an incomplete message, for example, a sentence divided into "w", "h", "a", "t" and "happened?" as shown in FIG. 28, the message box information extraction and analysis module 11 may interpret the divided sentence on the basis of the sentence form, the emotional symbols, and the time and response time of sending messages by the user and the chatting counterpart, and combine the divided sentence as a complete message of "What happened?".

Figure 26:
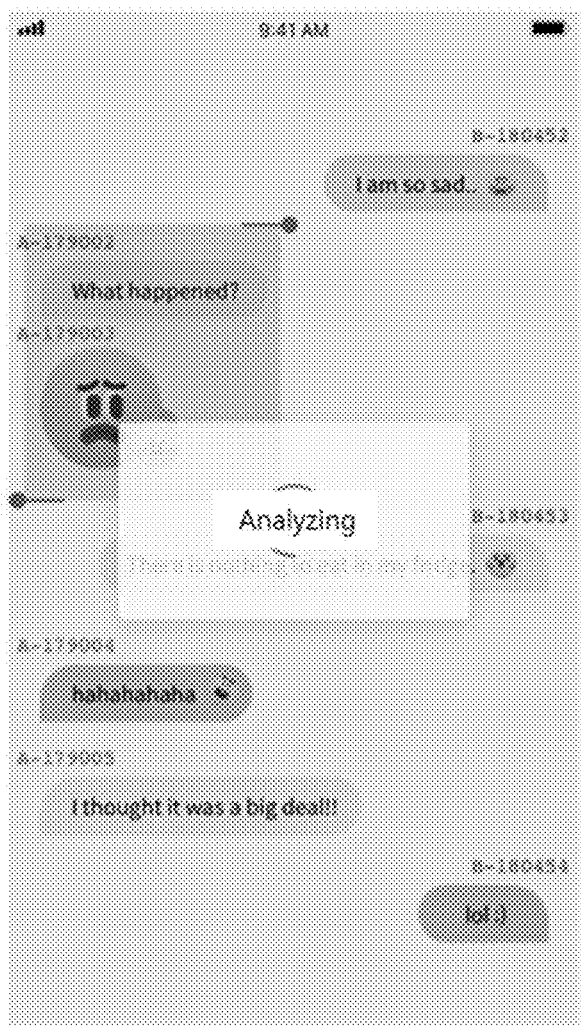

In addition, the message box information extraction and analysis module 11 may extract the meaning and the strength of the information that the text and the expression item have as shown in FIG. 26 and extract a specific emotion by connecting the meaning and the strength. For example, when text about a specific emotion, e.g., text information of "SAD", is extracted from the message box, the message box information extraction and analysis module 11 may execute sematic analysis on the specific emotion that the "SAD" has and extract that the user writing "SAD" is in a sad emotional state, and when an expression item about a specific emotion, e.g., expression item information of "emoticon of a smiling face", is extracted from the message box, the message box information extraction and analysis module 11 may execute sematic analysis on the specific emotion that the "emoticon of a smiling face" has and extract that the user writing "emoticon of a smiling face" is in a happy emotional state.

The message box information extraction and analysis module 11 may also execute analysis of an expression that a user desires to say through the analysis like this.

The user information extraction and analysis module 12 performs a function of extracting and analyzing information on a user using a chatting service through the user terminal 100, and at this point, the user information may include at least user profile picture information, user gender information, user state notification word information and the like.

Here, the user information extraction and analysis module 12 may extract the extroverted characteristic of the user when the user profile picture information is a picture of the face of the user, and extract interest elements of the user when the user profile picture information is pictures of an exhibition that the user has viewed, pictures of flower arrangement, or pictures of a musical band.

In addition, for example, when the user profile picture information is information on a picture taken together with a large number of people at a festival site, the user information extraction and analysis module 12 may analyze the information and derive an analysis result that the user has an extroverted characteristic, and when the user state notification word is stored as "feeling depressed", the user information extraction and analysis module 12 may derive an analysis result that the user's emotional state is a sad state.

Through this, the user information extraction and analysis module 12 may analyze the emotional state of a user and inclination of the user.

The element deriving module 13 may derive an element that will be inputted into the expression item creation learning engine 20 from the text information, the expression item information and the user information extracted and analyzed by the message box information extraction and analysis module 11 and the user information extraction and analysis module 12.

At this point, the elements may include attribute information of each element, and the attribute information of each element may include, for example, text information, expression classification information, expression type information, image information matching to expression information, information on the number of use of each of a plurality of users, image information matching to the user information, feedback processing information and the like.

For example, when the message box information extraction and analysis module 11 extracts text information of "SAD" and analysis of the emotion that the "SAD" has derives a result of "sad feeling", the element deriving module 13 may derive a plurality of associated expression items corresponding to the "sad feeling". In addition, when the message box information extraction and analysis module 11 extracts expression item information of "emoticon of crying face" and analysis of the emotion that the "emoticon of crying face" has derives a result of "sad feeling", the element deriving module 13 may derive a plurality of text and associated expression items corresponding to the "sad feeling" and closely associated with the "emoticon of crying face".

In addition, when an analysis result that the user likes music and has an extroverted characteristic is derived by the user information extraction and analysis module 12 as a result of extracting user profile picture information, the element deriving module 13 may derive text and/or expression items highly similar to the features of the profile picture information of the user, i.e., a plurality of text information and expression item information related to music and having extroverted elements.

At this point, a plurality of expression items derived by the element deriving module 13 may be derived by comparing and matching the text information, the expression item information and the user information extracted and analyzed by the preprocessor 10 with the text and a plurality of expression items previously learned and stored in the database 250, and this process may be trained through machine learning.

The expression item creation learning engine 20 performs a function of receiving preprocessed information from the preprocessor 10 through the database 250, performing machine learning and learning needed for creation of the expression items, and recommending the learned information to the user. The learning information of the expression item creation learning engine 20 learned through the machine learning algorithm may also be applied to the expression item creation learning model 232 described above.

More specifically, the expression item creation learning engine 20 for detailed analysis of the analysis unit 260 may be configured to include a derived-element learning module 21, an expression item creation and recommendation module 22, and an accuracy analyzing and reflecting expression item recommendation module 23.

The derived-element learning module 21 may analyze an expression item initial model by repeatedly learning the information extracted, analyzed and derived by the preprocessor 10. At this point, the expression item initial model may include at least an expected answer of the user, preference of each user for an expression item, a relation between the user and the chatting counterpart, dialog trend of today or this week, a recommended answer of each user and the like, and the expression item initial model may also be updated by reflecting the newly learned information.

For example, when the user inputs "I am so sad" and receives a response "what?" from the chatting counterpart after the user and the chatting counterpart talk about food, the derived-element learning module 21 may extract an element that the user may present the chatting counterpart as a response, i.e., a response of a form such as "There is nothing to eat in my fridge", "Because I'm starving" or the like, which is an expression item initial model.

In addition, when text information most frequently inputted by a plurality of users using a chatting service today is, for example, "omg" or "Are you kidding me?", the derived-element learning module 21 may extract the trend of today's dialog as an expression image item initial model by learning and analyzing the text information, grasp a relation of friends, family members, supervisors, lovers or the like by learning and analyzing dialog contents of the user and the chatting counterpart using a chatting service, and extract a response appropriate to the relation as an expression item initial model.

The expression item creation and recommendation module 22 performs a function of creating expression items matching the dialog context and recommending the expression items to the user on the basis of the expression item initial model that is learned and analyzed by the derived-element learning module 21, and at this point, the expression items may be configured in the form of text, an expression item of text, emoji or emoticon, or a combination of emoji, emoticon and text.

When the user inputs, for example, "I am so sad" and receives a response "what?" from the chatting counterpart after the user and the chatting counterpart talk about food, the expression item creation and recommendation module 22 may create an expression item of a text form including a specific expression item, i.e., "There is nothing to eat in my fridge", "Because I'm starving" and the like, which is an expression item initial model learned and analyzed by the derived-element learning module 21, an expression item of a form of emoji and emoticon, or an expression item of a form combining text, emoji and emoticon, and recommend a response to the user.

In addition, when the today's dialog trend learned and analyzed by the derived-element learning module 21 is "hahahaha", "Are you kidding me?" or "omg", the expression item creation and recommendation module 22 may create text including "hahahaha", "Are you kidding me?", "omg" or the like, an expression item of a form of emoji and emoticon, or an expression item of a form combining text, emoji and emoticon, and recommend the item to the user.

According to design, when an expression item is recommended, the expression item creation and recommendation module 22 may recommend an expression item that is set and recommended by a specific user, i.e., a public figure or a celebrity. At this point, the specific user may be set by a manager of the service providing apparatus 200, and the expression item set and recommended by the specific user may be configured as an expression item preferred by the specific user, which is automatically learned and analyzed by the derived-element learning module 21, or an expression item created by the specific user himself or herself.

The accuracy analyzing and reflecting expression item recommendation module 23 is a module for analyzing accuracy of the expression item created and recommended by the expression item creation and recommendation module 22 and recommending an expression item reflecting the accuracy to the user, which may show a calculation result value of the expression item created and recommended by the expression item creation and recommendation module 22.

In addition, the accuracy analyzing and reflecting expression item recommendation module 23 may recommend an expression item to the user by expressing a calculation result value of the expression item in a different way of highlight display, shadow display, gradation display, animation, various kinds of expression and effect functions and the like according to emphasis on the meaning, strength of emotion, importance, mood, situation, environment or the like.

For example, the accuracy analyzing and reflecting expression item recommendation module 23 may display a calculation result of the expression item in percentage (%), and the numerical value of the percentage may vary according to accuracy, and an expression item having a percentage of the highest numerical value may be highlighted or displayed to be relatively larger than the other expression items. In addition, when the emotional state of the user or the chatting counterpart is a sad state, the accuracy analyzing and reflecting expression item recommendation module 23 may display the speech bubble in a dark color and display an expression image item describing the emotional state.

The accuracy analyzing and reflecting expression item recommendation module 23 may be designed to be automatically executed or to perform analysis and application when the user selects a specific icon, e.g., an icon of an analysis and execution button.

Figure 24:
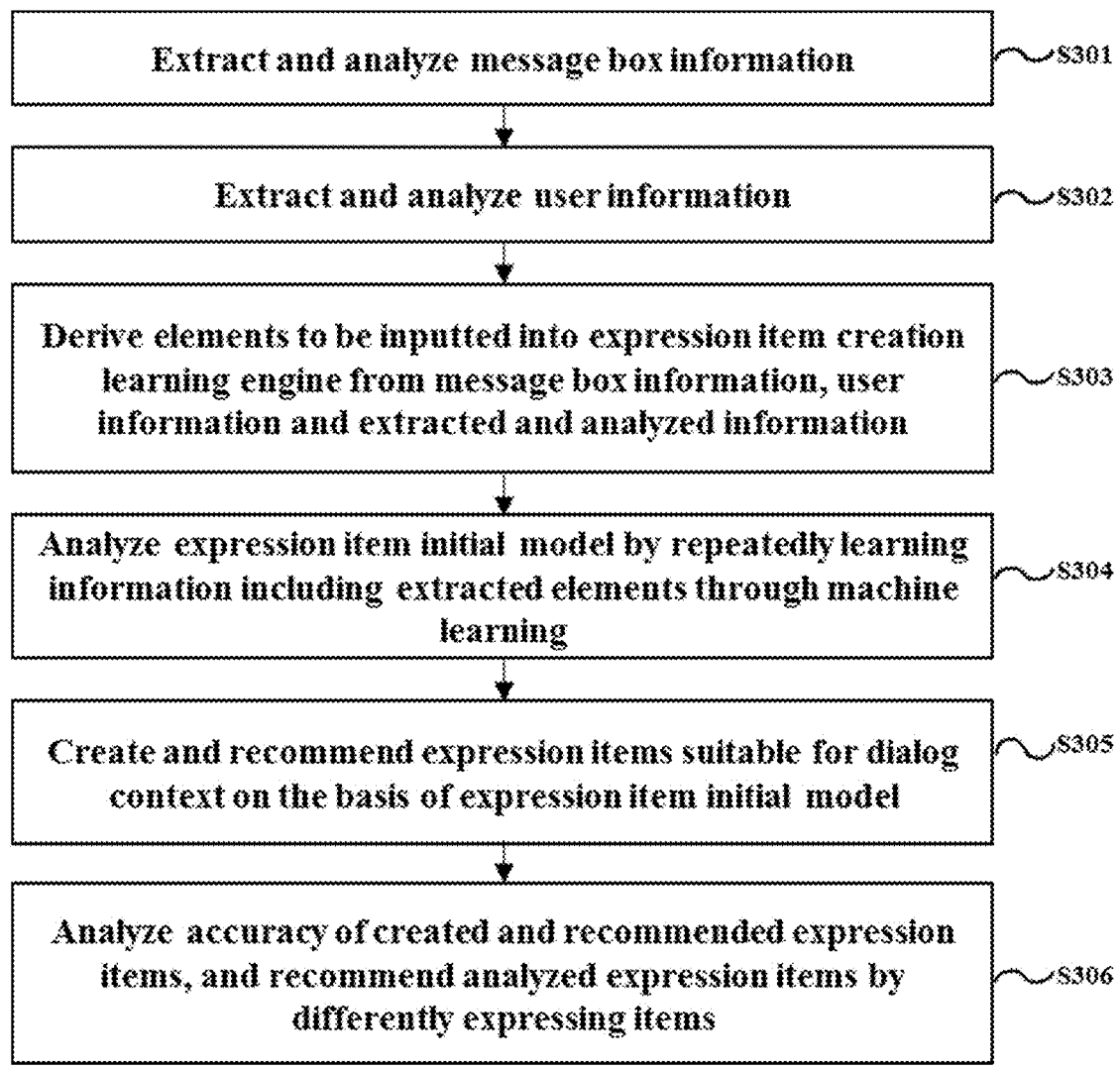

FIG. 24 is a flowchart illustrating an expression item recommendation method according to an embodiment of the present invention, and FIGS. 25 to 39 are views showing a message interface provided according to an embodiment of the present invention.

Figure 25:
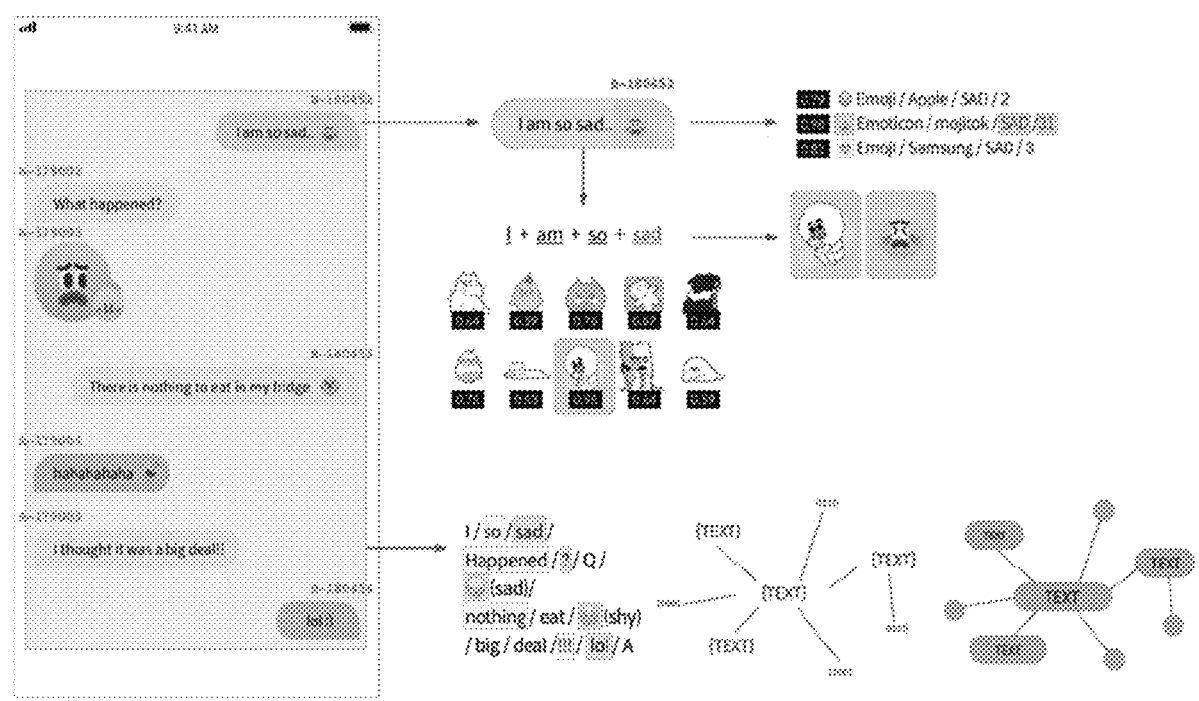
Figure 27:
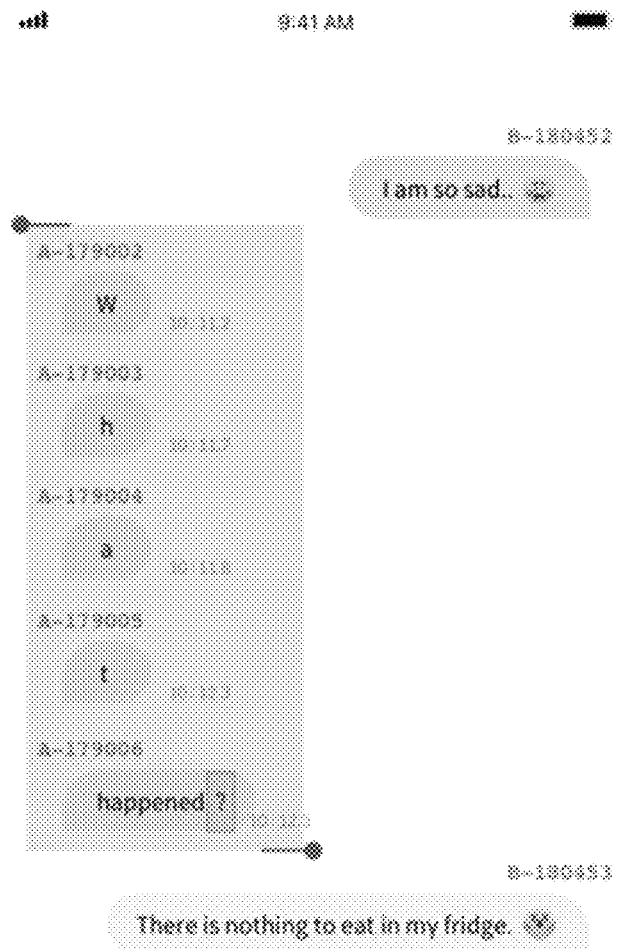

Referring to FIG. 24, the service providing apparatus 200 first extracts text information and expression item information included in the message box information and analyzes the extracted information. At this point, the text information and the expression item information may be extracted as text or a numerical value by analyzing the information that text and an expression item have. In addition, when the message box information is analyzed, the user himself or herself may specify a range as shown in FIGS. 25 to 27 or the apparatus may automatically recognize the range to analyze the message box information. When the text information and the expression item information included in the message box are analyzed, the sentence form, emotional symbols, the time and response time of sending messages by the user or the chatting counterpart and the like may be analyzed, and the service providing apparatus 200 may grasp through the analysis whether the inputted message is a successive sentence or a sentence transmitted in division, and when the chatting counterpart transmits an incomplete message, for example, a sentence divided into "w", "h", "a", "t" and "happened?" as shown in FIG. 28, the message box information extraction and analysis module 11 may analyze the divided sentence on the basis of the sentence form, the emotional symbols, and the time and response time of sending messages by the user and the chatting counterpart and combine the divided sentence as a complete message of "What happened?". In addition, when text information of "SAD" is extracted from the message box, the message box information extraction and analysis module 11 may execute analysis of the meaning that the "SAD" has, i.e., analysis of emotion that the "SAD" has, and when expression item information of "emoticon of crying face" is extracted from the message box, the message box information extraction and analysis module 11 may execute analysis of the meaning that the "emoticon of crying face" has, i.e., analysis of emotion that the "emoticon of crying face" has (step S301).

Next, the service providing apparatus 200 extracts and analyzes user profile picture information, user gender information, user state notification word information and the like included in the user information. At this point, when the user profile picture information is extracted, the service providing apparatus 200 may analyze the extroverted characteristic of the user or the semantic information that the picture contains or may extract the user state notification word information and analyze the meaning of the emotional state of the user. For example, when the user profile picture information is information on a picture taken together with a large number of people at a festival site, the service providing apparatus 200 may analyze the information and derive an analysis result that the user has an extroverted characteristic, and when the user state notification word is stored as "feeling depressed", the service providing apparatus 200 may derive an analysis result that the user's emotional state is a sad state (step S302).

Figure 29:
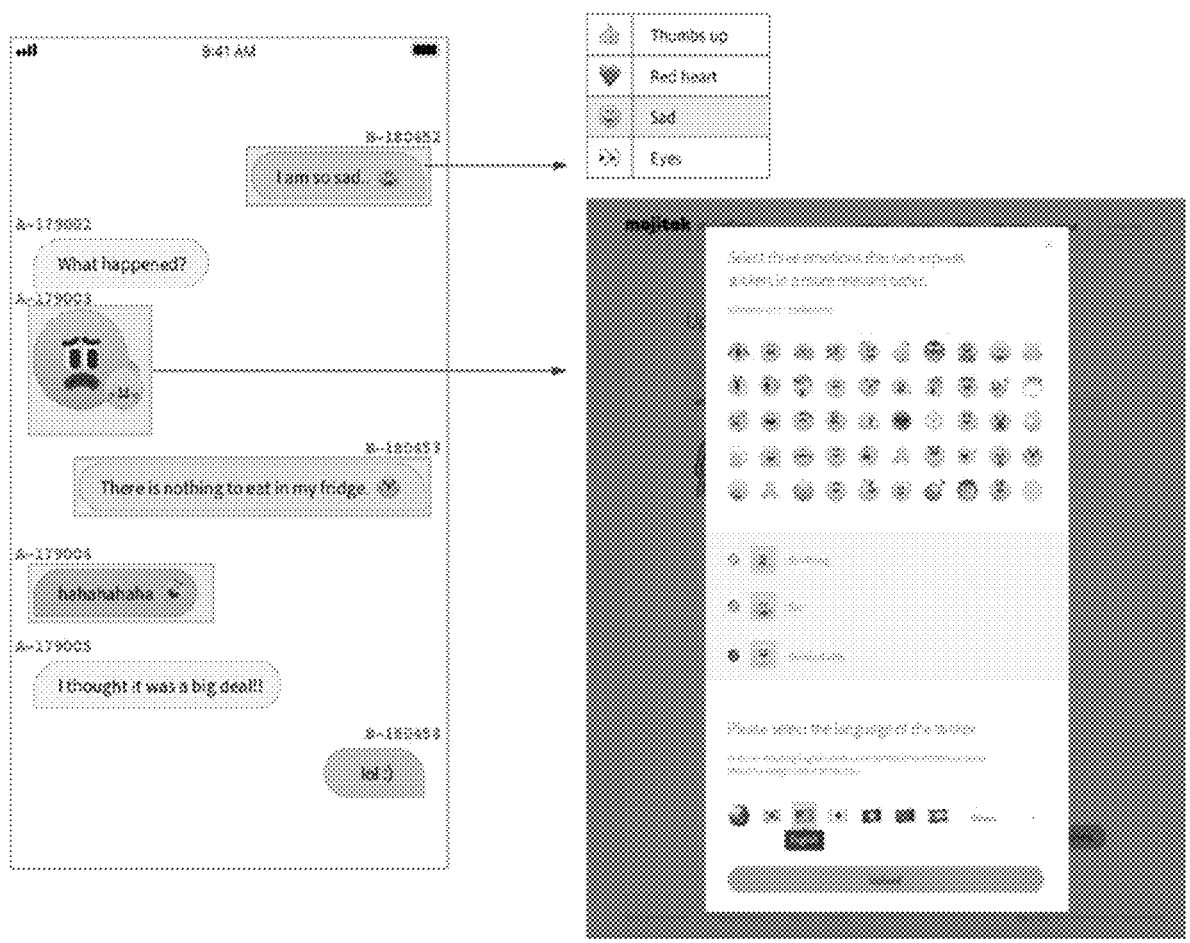
Figure 30:
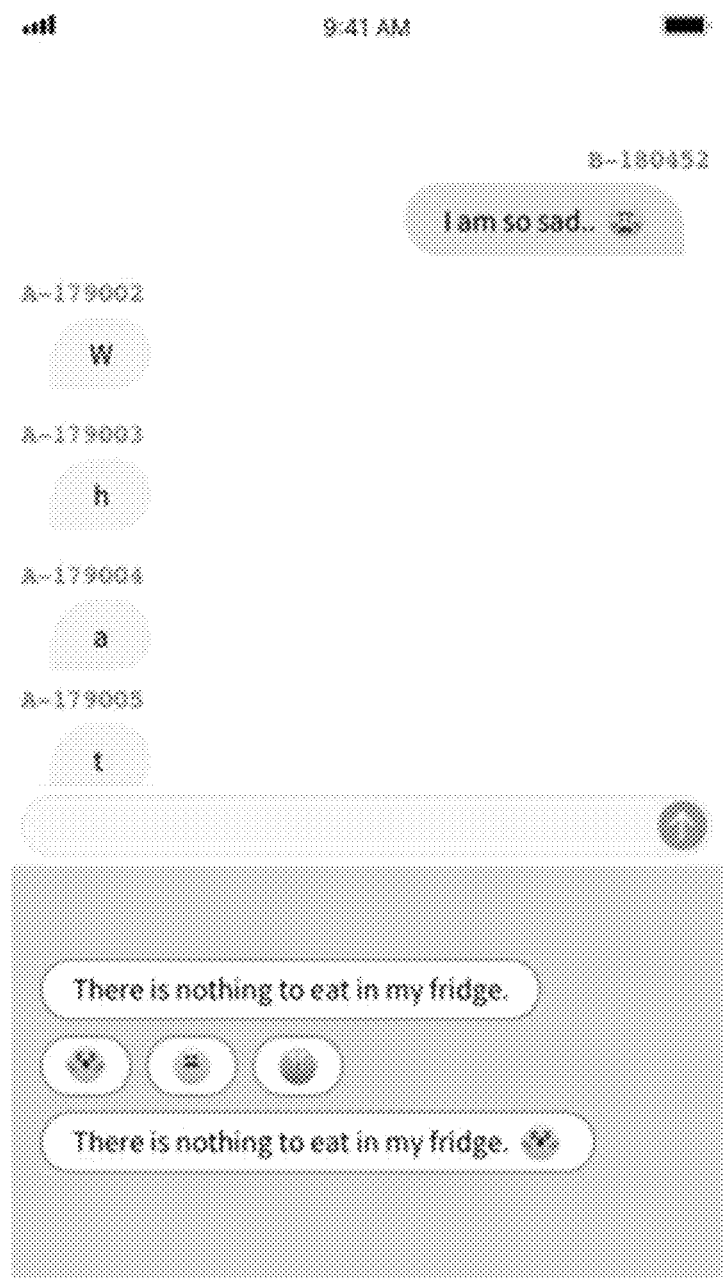
Figure 31:
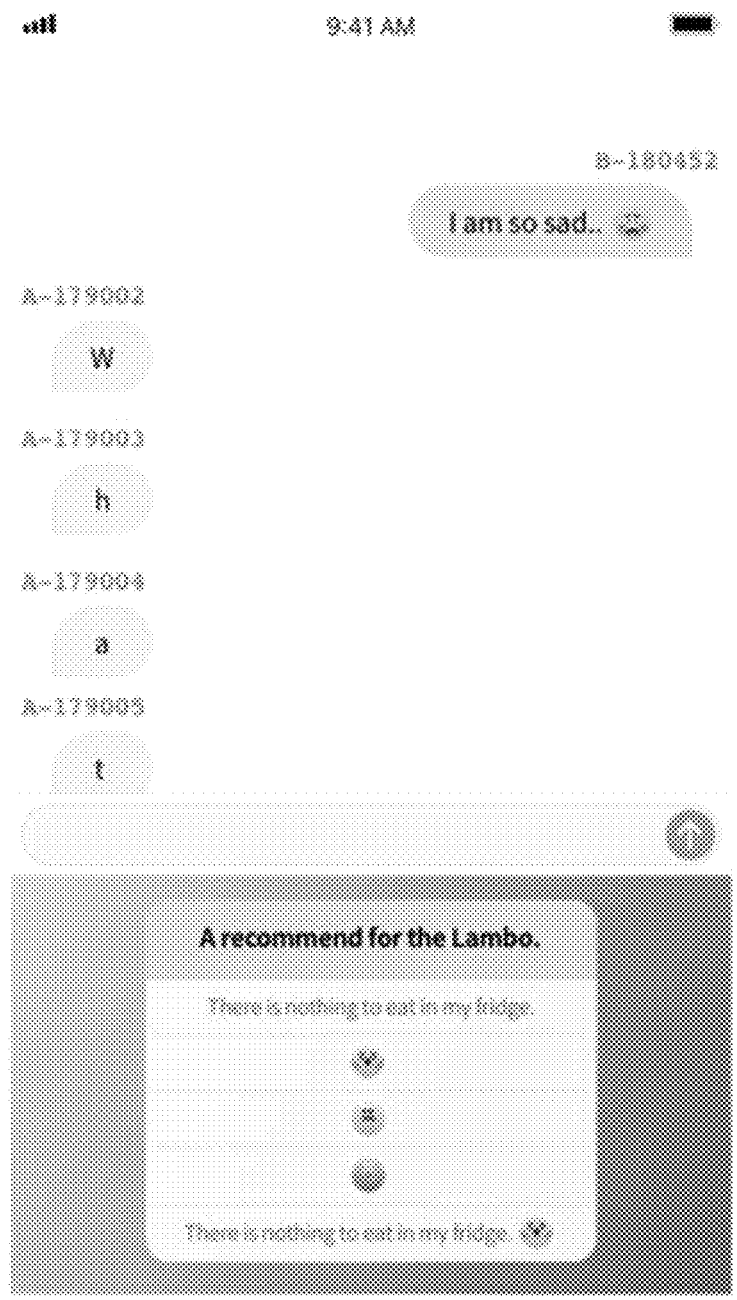
Figure 32:
Figure 33:
Figure 34:
Figure 35:
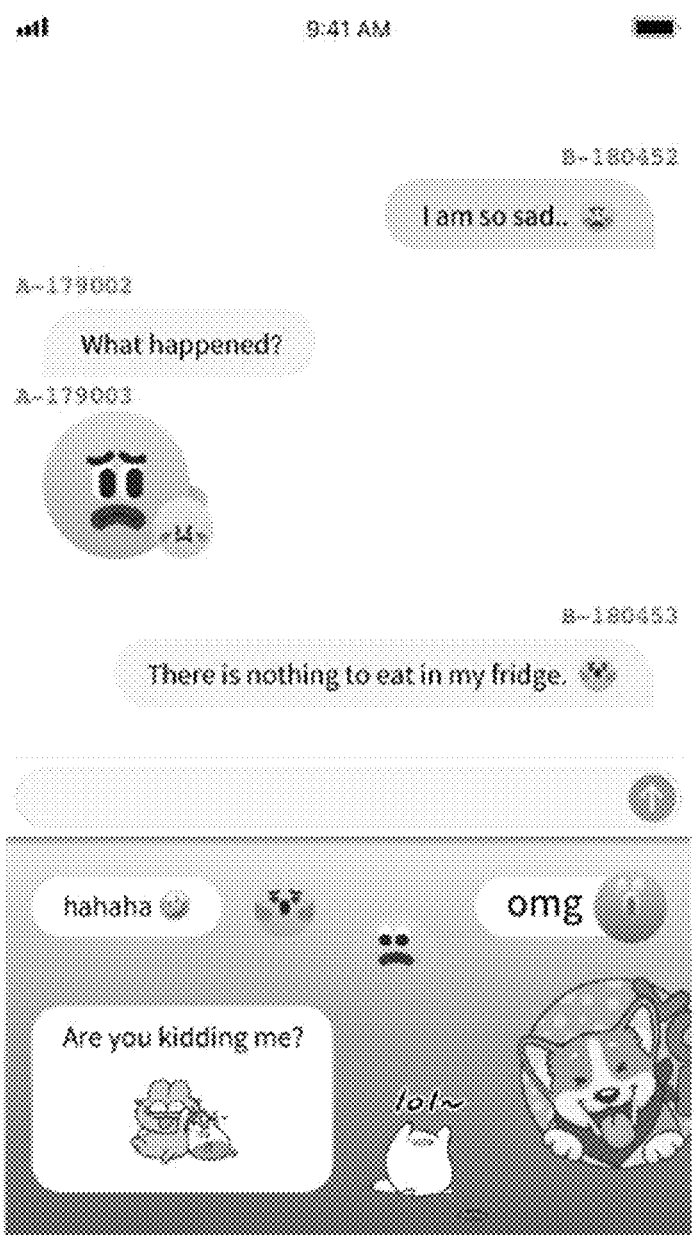

Next, the service providing apparatus 200 derives an element that will be inputted into the expression item creation learning engine from the information extracted and analyzed from the message box information and the user information. For example, when text information of "SAD" is extracted from the message box information as shown in FIG. 29 and analysis of the emotion that the "SAD" has derives a result of "sad feeling", the service providing apparatus 200 may derive a plurality of associated text and expression items corresponding to the "sad feeling". In addition, when expression item information of "emoticon of crying face" is extracted from the message box information and analysis of the emotion that the "emoticon of crying face" has derives a result of "sad feeling", the service providing apparatus 200 may derive a plurality of text and associated expression items corresponding to the "sad feeling" and closely associated with the "emoticon of crying face". In addition, when an analysis result that the user likes music and has an extroverted characteristic is derived as a result of extracting user profile picture information from the user information, the service providing apparatus 200 may derive text or expression items highly similar to the features of the profile picture information of the user, i.e., a plurality of text information and expression item information related to music and having extroverted elements (step S303).

Next, the service providing apparatus 200 analyzes the expression item initial model by repeatedly learning the information including the extracted element through machine learning. At this point, the expression item initial model may include at least an expected answer of the user, preference of each user for an expression image item, a relation between the user and the chatting counterpart, dialog trend of today or this week, a recommended answer of each user and the like, and the expression item initial model may also be updated by reflecting the newly learned information. For example, when the user inputs "I am so sad" and receives a response "what?" from the chatting counterpart after the user and the chatting counterpart talk about food, the service providing apparatus 200 may extract an element that the user may present the chatting counterpart as a response, i.e., a response of a form such as "There is nothing to eat in my fridge", "Because I'm starving" or the like, which is an expression item initial model. In addition, when text information most frequently inputted by a plurality of users using a chatting service today is, for example, "omg" or "Are you kidding me?", the service providing apparatus 200 may extract the trend of today's dialog as an expression item initial model by learning and analyzing the text information, grasp a relation of friends, family members, supervisors, lovers or the like by learning and analyzing dialog contents of the user and the chatting counterpart using a chatting service, and extract and analyze a response appropriate to the relation as an expression image item initial model (step S304).

Figure 36:
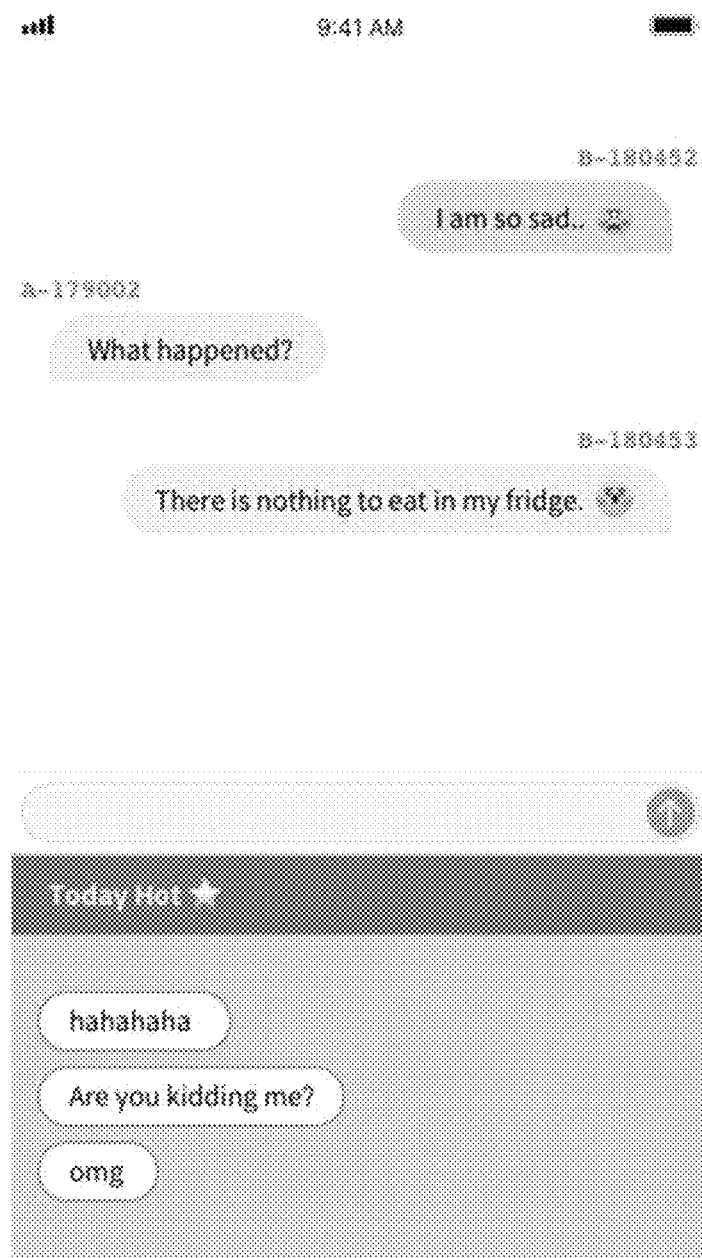
Figure 37:
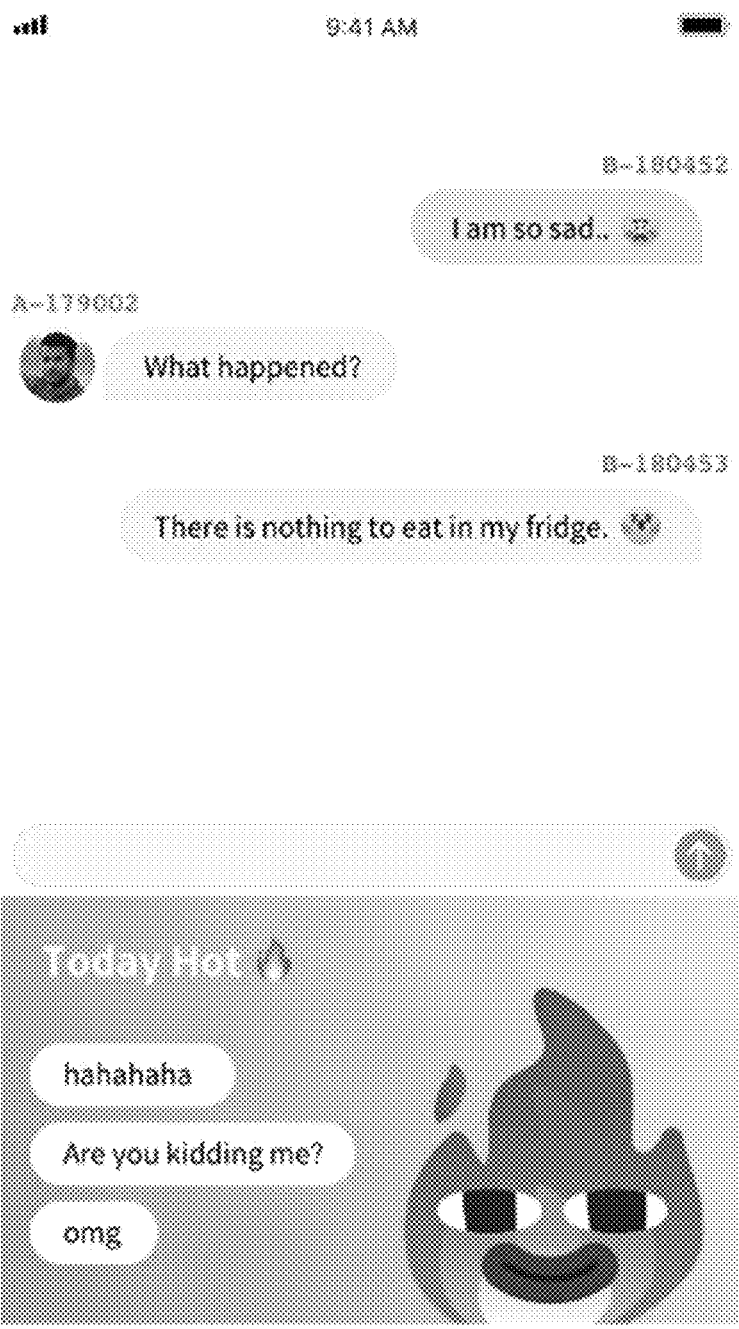
Figure 38:
Figure 39:
Figure 40:
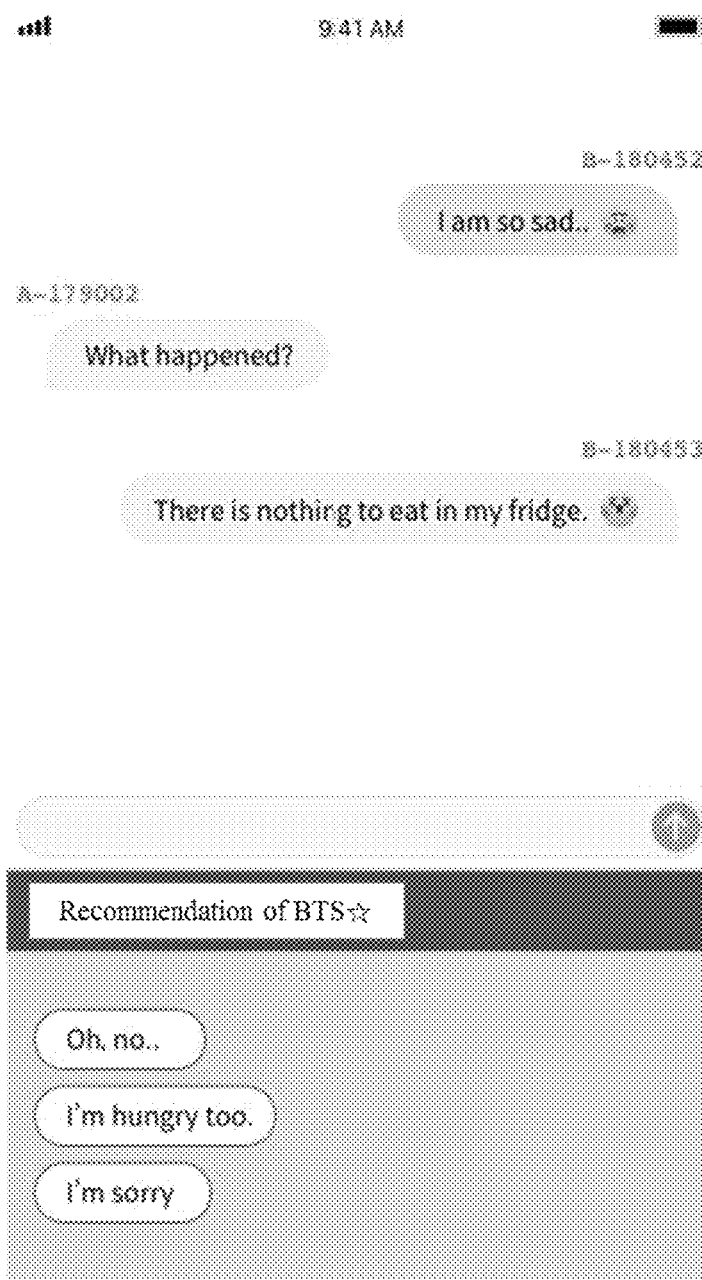

After extracting and analyzing the expression item initial model, the service providing apparatus 200 performs learning needed for creation of expression items, and performs a function of recommending the expression items to the user on the basis of the learned information. At this point, the learning information may go through a machine learning process, and one or more processing methods may be used in the machine learning algorithm of the machine learning process. Furthermore, prior learning is performed by applying input variables and target variables to a plurality of machine learning algorithms and a plurality of combinations of machine learning algorithms, and an optimum machine learning algorithm or an optimum combined machine learning algorithm may be determined considering at least one among the accuracy of each algorithm according to a learning result, a computation time with respect to accuracy, a performance ratio, and fitness of the model. That is, the service providing apparatus 200 may recommend an expression item, which is an answer appropriate to the dialog context, to the user by learning the extracted, analyzed and derived information according to classification information thereof and analyzing the initial expression item initial model. For example, the service providing apparatus 200 may recommend an expression item suitable for the dialog context to the user as shown in FIGS. 30 to 35, and more specifically, for example, when the user inputs "I am so sad" and receives a response "what?" from the chatting counterpart after the user and the chatting counterpart talk about food, the service providing apparatus 200 may create an expression item of a text form, an expression item of a form of emoji and emoticon, or an expression item of a form combining text, emoji and emoticon, which includes an element that the user may present the chatting counterpart as a response, i.e., a response of a form such as "There is nothing to eat in my fridge", "Because I'm starving" or the like, which is an expression item initial model, and recommend an answer to the user. In addition, when text information most frequently inputted by a plurality of users using a chatting service today is, for example, "omg" or "Are you kidding me?" as shown in FIGS. 36 and 37, the service providing apparatus 200 may extract the trend of today's dialog as an expression item initial model by learning and analyzing the text information, create an expression item of a text form including "Are you kidding me?", "omg" or the like, an expression item of a form of emoji and emoticon, or an expression item of a form combining text, emoji and emoticon, and recommend the expression item to the user. In addition, the service providing apparatus 200 may grasp a relation of friends, family members, supervisors, lovers or the like by learning and analyzing dialog contents of the user and the chatting counterpart using a chatting service, extract a response appropriate to the relation as an expression item initial model, and recommend the expression item initial model to the user as shown in FIGS. 39 and 40, and may analyze and extract a dialog type, a persona and the like of the chatting counterpart according to the text information inputted by the chatting counterpart and the expression image item information, and display the dialog type or the persona to the user. The displayed contents may include, for example, "the counterpart generally uses courtesy words.", "the counterpart generally uses positive expressions." or the like, and feedback may be obtained from the user by displaying contents like "Has your relationship improved recently?" or the like. The feedback obtained from the user may be reflected when the dialog type, the persona and the like are analyzed and extracted later to enhance accuracy.

Figure 41:
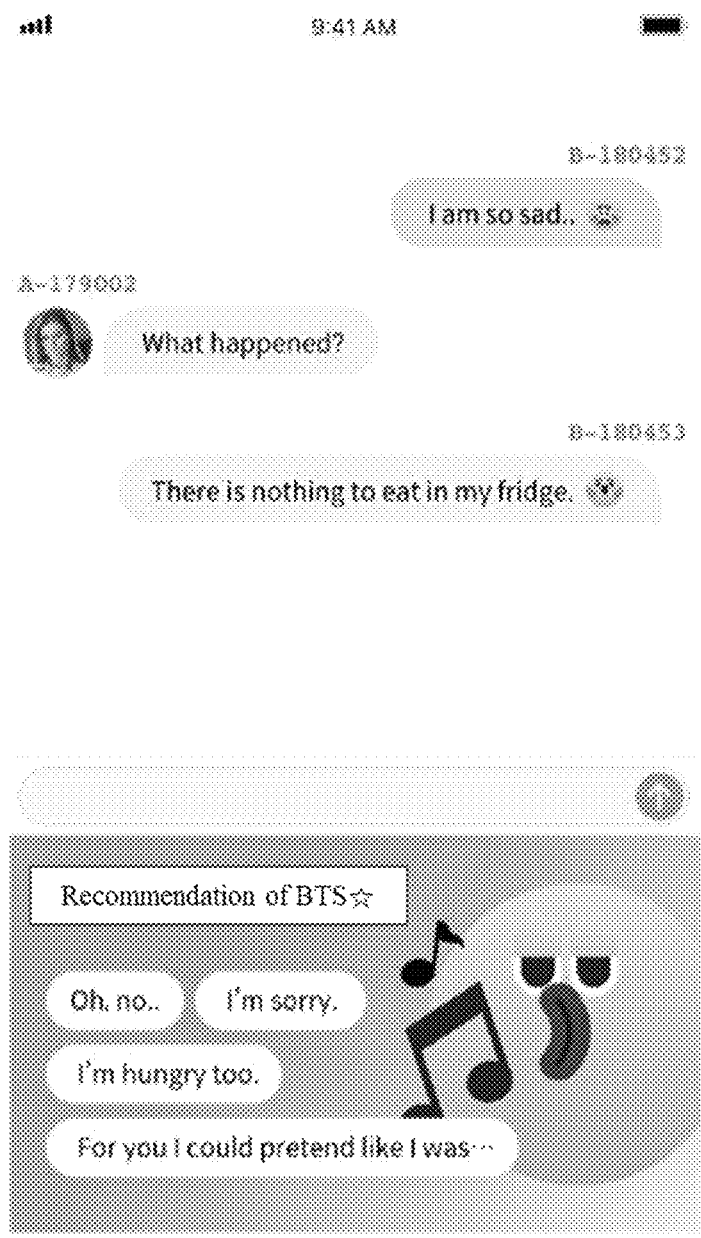

Meanwhile, as shown in FIGS. 40 and 41, when an expression item is recommended, the service providing apparatus 200 may recommend an expression item that is set and recommended by a specific user, i.e., a public figure or a celebrity. At this point, the specific user may be set by a manager of the service providing apparatus 200, and the expression item set and recommended by the specific user may be configured as an expression item preferred by the specific user, which is automatically learned and analyzed by the derived-element learning module 21, or an expression item created by the specific user himself or herself (step S305).

Figure 42:
Figure 43:
Figure 44:
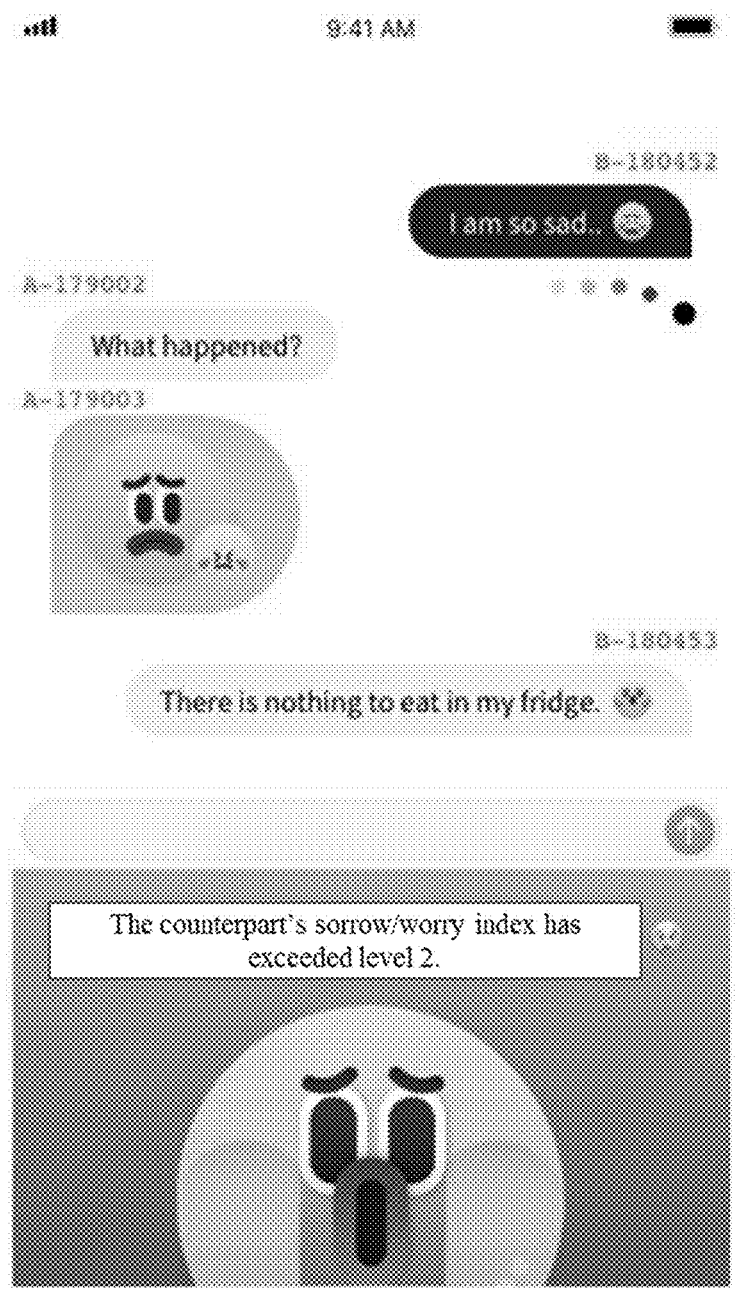
Figure 45:
Figure 46:
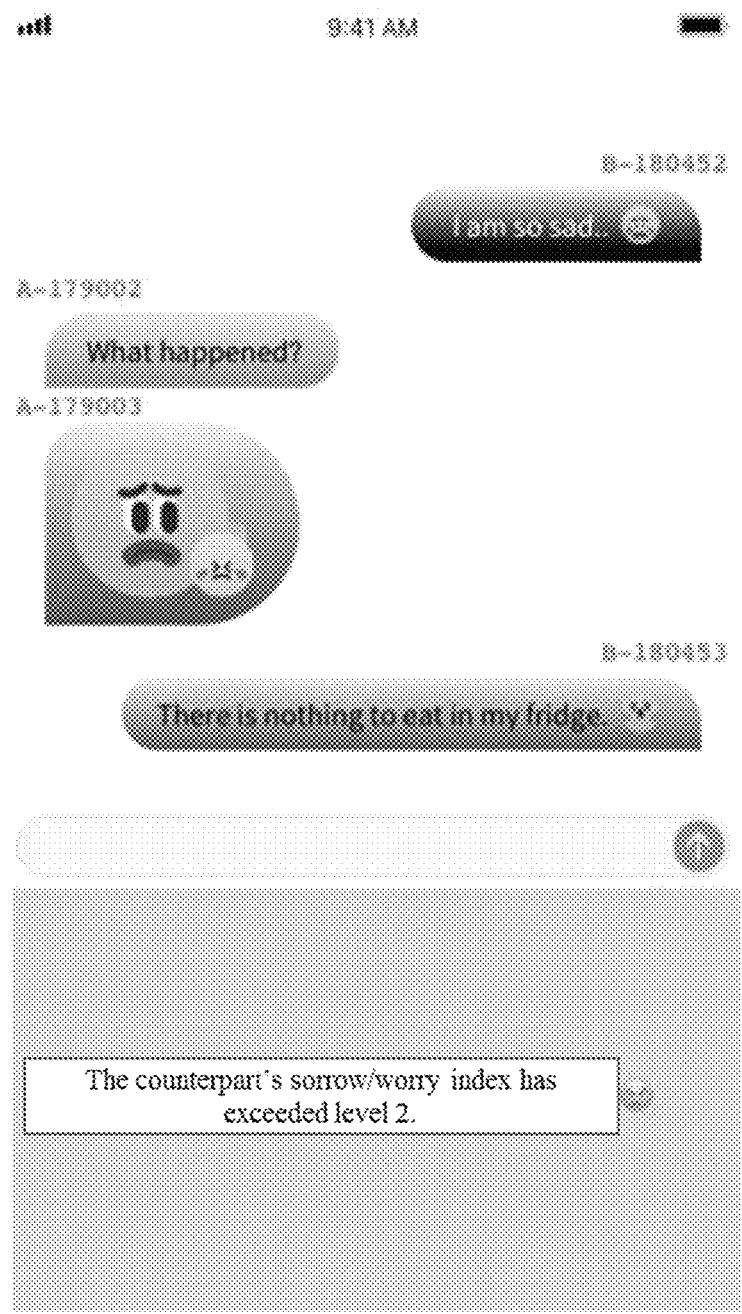
Figure 47:
Figure 48:

Next, the service providing apparatus 200 performs a function of analyzing accuracy of the created and recommended expression image items and recommending the expression items by displaying differently on the basis of the analysis result. At this point, the expression items may be displayed in a state including a calculation result value, and the service providing apparatus 200 may recommend an expression item to the user by expressing a calculation result value of the expression item in a different way of highlight display, shadow display, gradation display, animation, various kinds of expression and effect functions and the like according to emphasis on the meaning, strength of emotion, importance, mood, situation, environment or the like. For example, the service providing apparatus 200 may display a calculation result of the expression item in percentage (%) as shown in FIG. 42, and the numerical value of the percentage may vary according to accuracy, and an expression item having a percentage of the highest numerical value may be highlighted or displayed to be relatively larger than the other expression items. In addition, as shown in FIGS. 43 to 47, the service providing apparatus 200 may display the speech bubble in a bright color when the emotional state of the user or the chatting counterpart is determined as a happy state on the basis of the text information inputted by the user or the chatting counterpart and the expression item information, display the speech bubble in a dark color when the emotional state is determined as a sad state, and display an expression item describing the emotional state under the dialog window, or as shown in FIG. 48, the service providing apparatus 200 may divide the emotional state of the user or the chatting counterpart into levels and display a level of emotion under the speech bubble (step S306).

Meanwhile, the methods according to various embodiments of the present invention described above may be implemented in the form of an installation data for being executed in a terminal device or a server and provided in correspondence to each server or device in a state stored in various non-transitory computer-readable media. Accordingly, the user terminal 100 may download the installation data by utilizing or connecting to the server or the device.

The non-transitory computer-readable medium means a medium that stores data semi-permanently and can be read by a device, not a medium which stores data for a short period of time such as a register, cache, memory or the like. Specifically, the diverse applications or programs described above may be provided in a non-transitory computer-readable medium such as a CD, a DVD, a hard disk, a Blue-ray disk, USB, a memory card, ROM or the like.

According to the embodiments of the present invention, there is provided a message service providing apparatus and a method thereof, which can construct an expression item database as a learning process-based active object database according to various user variable information such as an interface environment including extended reality, user profile, distribution environment, user's emotion, message contents and the like, determine suitable expression items corresponding to a message inputted by the user, and provide the expression items as an user-selectable expression package list.

Therefore, according to the embodiments of the present invention, there is provided a message service providing apparatus and a method thereof, which can recommend emoji and emoticons for messages exchanged by inputting dialog between interface parties of a message interface based on extended reality, in which the recommended emoji and emoticons allow expression items to be recommended considering suitability according to the emotional state of a user and analysis of dialog context of a message.

In addition, although preferred embodiments of the present invention are shown and described above, the present invention is not limited to the specific embodiments, and various modified embodiments can be made by those skilled in the art without departing from the gist of the present invention claimed in the claims described below, and these modified embodiments should not be individually understood from the spirit and prospect of the present invention.

What is claimed is:

1. A message service providing apparatus comprising:
a message interface unit processor configured to provide a message interface to a user terminal, process a message transmitted and received through the message interface, and provide one or more expression items that can be included in the message to the user terminal through the message interface; and
an active object database management processor configured to perform an active object database management process of each expression item to provide one or more expression items through an extended reality interface,
wherein the one or more expression items are actively classified, stored and managed by the active object database management processor based on analysis information generated by an analysis processor, and
wherein the message service providing apparatus further comprises an expression item combination processor configured to combine the one or more expression items based on the analysis information of the analysis processor and an expression item creation learning model, wherein the expression item creation learning model determines a modeling condition of a condition for learning and performs a three-dimensional conversion learning process corresponding to two-dimensional expression items according to classification information of two-dimension, three-dimension, augmented reality (AR) or virtual reality (VR) acquired from item classification information based on the analysis information, and attributes, registration information, setting information, and tagging and learning information of an expression item to be created, and wherein the three-dimensional conversion learning process includes a process of enhancing a sense of reality according to determination of a color control variable and a shade control variable for three-dimensional conversion learning about a combination of two-dimensional expression items.

2. The apparatus according to claim 1, wherein the analysis processor is configured to perform analysis on a dialog transmitted and received through the message interface, wherein the analysis of dialog includes at least one among an analysis based on Unicode interpretation and an analysis based on emotion interpretation.

3. The apparatus according to claim 1, wherein the active object database management processor classifies, stores and learns a multimedia expression data set for extended reality including a plurality of database slots associated with each other, and allocates, based on analysis information corresponding to expression items registered in one or more slots among the plurality of database slots, other expression items matching the registered expression item to empty other slots, and wherein an allocation format of the other expression items matching the registered expression item is a format of any one among tag information, registration information, setting information, label information, token information, and block information that can be interpreted.

4. The apparatus according to claim 3, wherein the active object database management processor processes learning of allocation information of the other expression items matching the registered expression item, and distributes the multimedia expression data set for extended reality, to which the other expression items are allocated, to the user terminal through at least a path among a field, an API, a SDK, an App, a distribution-related program, and a related server according to a previously determined distribution field condition.

5. The apparatus according to claim 4, wherein the multimedia expression data set for extended reality is provided through at least one among a display interface, a dialog window interface, a keyboard interface and a multimodal interface of extended reality using the user terminal, and includes device setting information corresponding to a multimodal condition value utilized in extended reality, and the active object database management processor learns, stores and manages the device setting information.

6. The apparatus according to claim 5, wherein in allocating the other expression items matching the multimedia expression items for extended reality, the active object database management processor performs a top-priority matching process for determining an allocation priority of the other expression items.

7. The apparatus according to claim 6, wherein the active object database management processor compositely calls, combines and provides the other expression items corresponding to the multimedia expression items for extended reality in response to a request of the user terminal, and the analysis processor provides as a variable of an expression item creation learning model for active object database management based on at least one among multimedia application information, sound time information, image background information, and dialog environment information according to the combined provision.

8. The apparatus according to claim 7, wherein the active object database management processor processes distribution of the multimedia expression data set for extended reality according to information learned from the expression item creation learning model and determination on a score or a condition corresponding to current environment information.

9. The apparatus according to claim 1, wherein the analysis processor comprises:

a preprocessor extracting and analyzing text information and expression image item information, which are chatting messages transmitted and received between a user and a counterpart using the message interface, extracting and analyzing user information including at least user profile picture information, user gender information, and user state notification speech information, and deriving element information to be inputted into expression image item creation learning based on the text information, the expression image item information, and the user information, and an expression image item creation learning engine analyzing an expression image item initial model by repeatedly learning the element information derived by the preprocessor, creating and recommending expression image items matching dialog context based on the learned and analyzed expression image item initial model, analyzing accuracy of the recommended expression image items and showing a calculation result value thereof, and recommending expression image items reflecting the accuracy to the user.

10. The apparatus according to claim 1, further comprising a user information management processor configured to provide a registration process of the user terminal for configuration of a data set of expression items by an item registration processing processor, and provide a compensation service corresponding to a participating user, wherein compensation information according to the compensation service is separately stored, called and managed by a database, and the user information management processor creates and shares compensation log records and compensation-related blocks on a shared network.

11. The apparatus according to claim 1, wherein the active object database management processor performs configuration of a data set including a plurality of slots in response to extended reality, performs, when a data is registered in a specific slot, a process of converting the registered data to an asset of another format using information learned in advance according to a condition corresponding to extended reality, performs a process of allocating the data to an empty slot of the data set, and creates a plurality of data sets based on learning information corresponding to extended reality according to the one registered data.

12. The apparatus according to claim 11, wherein the plurality of data sets includes an asset data set created based on sound matching, background matching, shade matching, color matching, and modeling learning information corresponding to each extended reality,
  wherein a learning-based modification of at least one among a model, a set environment, a position, a size, background transparency, background color change, image optimization of a user device to which the asset data set will be applied is performed on the asset data set according to learning information, and
  wherein additional effect information associated with animating is applied to the asset data set according to learning information.

13. The apparatus according to claim 12, wherein the active object database management processor performs a learning and recommendation process of the asset data set by profile, persona, type, theme, and trend based on dialog analysis analyzed by the analysis processor.

14. The apparatus according to claim 1, wherein the active object database management processor creates a learning model by performing a learning process based on at least one among distribution information of an asset data set, user profile information, and environment information and performs a process of determining an expression item to be recommended and provided to the user using the learning model.

15. An operating method of a message service providing apparatus comprising one or more computer processors, the operating method comprising:
  providing, by a message interface processor, a message interface to a user terminal;
  processing, by the message interface processor, a message transmitted and received through the message interface;
  providing, by an active object database management processor, one or more expression items that can be included in the message to the user terminal through the message interface; and
  performing an active object database management process of each expression item to provide one or more expression items through an extended reality interface,
  wherein the one or more expression items are actively classified, stored and managed by the active object database management processor based on analysis information generated by an analysis processor,
  wherein the operating method further comprises:
  combining, by an expression item combination processor, the one or more expression items based on the analysis information of the analysis processor and an expression item creation learning model,
  wherein the expression item creation learning model determines a modeling condition of a condition for learning and performs a three-dimensional conversion learning process corresponding to two-dimensional expression items according to classification information of two-dimension, three-dimension, augmented reality (AR) or virtual reality (VR) acquired from item classification information based on the analysis information, and attributes, registration information, setting information, and tagging and learning information of an expression item to be created, and
  wherein the three-dimensional conversion learning process includes a process of enhancing a sense of reality according to determination of a color control variable and a shade control variable for three-dimensional conversion learning about a combination of two-dimensional expression items.

16. The method according to claim 15, wherein the expression items are actively classified, stored and managed by the active object database management processor based on the analysis information analyzed by the analysis processor and learning information of a learning model.

17. The method according to claim 15, wherein the expression items provided through the message interface processor include a multimedia expression item, an expression sound item, an expression video item, an expression additional item, and a combination of these for extended reality.

18. The method according to claim 15, wherein the performing the active object database management process comprises:
  creating a learning model corresponding to a constructed database by performing a learning process based on at least one among distribution information, user profile information, and environment information;
  performing a process of determining an expression item to be recommended and provided to the user using the learning model;
  performing an expression item optimization process including conversion of a format and a size of the expression items according to the message interface and distribution information for providing the expression items;
  performing code conversion corresponding to the expression items to create an expression key database for linking the expression items to one database structure;
  configuring a database tree based on the code-converted expression items; and
  determining a key information extraction method for classifying the expression items, based on the database tree.

* * * * *